US009992812B2

United States Patent
Watanabe et al.

(10) Patent No.: US 9,992,812 B2
(45) Date of Patent: Jun. 5, 2018

(54) HANDOVER FAILURE DETECTION DEVICE, HANDOVER PARAMETER ADJUSTMENT DEVICE, AND HANDOVER OPTIMIZATION SYSTEM

(71) Applicant: NEC Corporation, Minato-ku, Tokyo (JP)

(72) Inventors: Yoshinori Watanabe, Tokyo (JP); Hiroto Sugahara, Tokyo (JP); Yasuhiko Matsunaga, Tokyo (JP); Yoshifumi Yanagisako, Tokyo (JP)

(73) Assignee: NEC CORPORATION, Tokyo (JP)

( * ) Notice: Subject to any disclaimer, the term of this patent is extended or adjusted under 35 U.S.C. 154(b) by 133 days.

(21) Appl. No.: 14/762,663

(22) PCT Filed: Nov. 14, 2013

(86) PCT No.: PCT/JP2013/006692
§ 371 (c)(1),
(2) Date: Jul. 22, 2015

(87) PCT Pub. No.: WO2014/122706
PCT Pub. Date: Aug. 14, 2014

(65) Prior Publication Data
US 2015/0373772 A1    Dec. 24, 2015

(30) Foreign Application Priority Data

Feb. 8, 2013    (JP) .................... 2013-022846

(51) Int. Cl.
*H04W 36/00* (2009.01)
*H04W 76/02* (2009.01)

(52) U.S. Cl.
CPC ..... *H04W 76/028* (2013.01); *H04W 36/0055* (2013.01)

(58) Field of Classification Search
CPC ..... H04W 8/183; H04W 48/18; H04W 36/30; H04W 36/18; H04W 36/12; H04W 36/04;
(Continued)

(56) References Cited

U.S. PATENT DOCUMENTS 8,576,797 B2    11/2013 Jang et al.
9,107,133 B2 *  8/2015 Catovic ................. H04W 36/30
(Continued)

FOREIGN PATENT DOCUMENTS

JP    2011259207 A    12/2011
JP    2012147258 A    8/2012
(Continued)

OTHER PUBLICATIONS

3rd Generation Partnership Project; Discussion and Approval,"Stage 2 definitions for Rei-10 intra-LTE MRO", Alcatel-Lucent, 3GPP TSG RAN WG3 Meeting #75, R3-120264, Dresden, Germany, Feb. 10, 2012.
Korean Office Action for KR Application No. 2015-7021351 dated Jul. 20, 2016 with English Translation.
NEC: "Consideration of handover failure in RN", 3GPP TSG-RAN WG3 Meeting #68, R3-101579, Agenda Item—14.3, Document for Discussion, vol. 1, Montreal, Canada, May 10-14, 2010, XP050425328.
(Continued)

*Primary Examiner* — Dai A Phuong

(57) ABSTRACT

A handover failure detection device (121) detects at least one of handover failure types regarding outgoing handover from a first cell (131) managed by a first base station (111) by observing: (a) presence/absence of reception by the first base station (111) of an acknowledgment response to a handover command regarding first handover of a mobile terminal (101) from the first cell (131) to a second cell (132) managed by a second base station (112); and (b) presence/absence of a request for connection re-establishment from the mobile terminal (101) to the first cell (131), the request occurring after initiation of the first handover. As a result, it contributes to improvement of handover failure detection or reduction of handover failure in a situation where exchange of information between base stations is restricted.

36 Claims, 25 Drawing Sheets

(58) Field of Classification Search
CPC ..... H04W 16/32; H04W 24/00; H04W 28/04; H04W 72/082
USPC ....... 455/418–421, 432.1–453, 456.1–456.3; 370/329–334
See application file for complete search history.

(56) References Cited

U.S. PATENT DOCUMENTS

| | | | | |
|---|---|---|---|---|
| 9,807,660 | B2* | 10/2017 | Gunnarsson | H04W 36/22 |
| 2011/0044285 | A1* | 2/2011 | Jang | H04W 36/02 |
| | | | | 370/331 |
| 2012/0170532 | A1* | 7/2012 | Kato | H04W 36/0072 |
| | | | | 370/329 |
| 2013/0084910 | A1* | 4/2013 | Suzuki | H04W 24/02 |
| | | | | 455/515 |
| 2013/0165108 | A1* | 6/2013 | Xu | H04W 24/04 |
| | | | | 455/423 |
| 2015/0181494 | A1* | 6/2015 | Zhang | H04W 24/02 |
| | | | | 370/331 |

FOREIGN PATENT DOCUMENTS

| | | |
|---|---|---|
| KR | 20110020398 A | 3/2011 |
| KR | 20110038571 A | 4/2011 |
| WO | 2010002926 A1 | 1/2010 |

OTHER PUBLICATIONS

CATT: "Discussion on use cases and solutions for MRO on HetNet scenario", 3GPP TSG RAM WG3 Meeting #75, R3-120115, Agenda Item—11.1.2, Document for Decision, Dresden, Germany, Feb. 6-20, 2012 , XP050566608.

3rd Generation Partnership Project; "Techinical Specification Group Radio Access Network; Evolved Universal Terrestrial Radio Access(E-UTRA) and Evolved Universal Terrestrial Radio Access Network(E-TRAN)", Overall Description, Stage 2(Release 10), 3GPP TS 36.300 V10.9.0, Dec. 2012, XP050691677.

Extended European Search Report for EP Application No. EP13874845.4 dated Aug. 16, 2016.

International Search Report for PCT Application No. PCT/JP2013/006692, dated Jan. 14, 2014.

3rd Generation Partnership Project;Technical Specification Group Radio Access Network, "Evolved Universal Terrestrial Radio Access (E-UTRA) and Evolved Universal Terrestrial Radio Access Network (E-UTRAN); Overall description;Stage 2(Release 9)", 3GPP TS 36.300 V9.7.0 (Mar. 2011).

Samsung, "Failure Detection without the RRC Re-establishment Attempt", 3GPP TSG-RAN WG3#77 R3-121761, Aug. 17, 2012. Cited in ISR.

Fujitsu, "Timers in MRO failure detection", 3GPP, TSG-RAN WG3#75bis R3-120641, Mar. 30, 2012. Cited in ISR.

* cited by examiner

HANDOVER FAILURE DETECTION DEVICE, HANDOVER PARAMETER ADJUSTMENT DEVICE, AND HANDOVER OPTIMIZATION SYSTEM

This application is a National Stage Entry of PCT/JP2013/006692 filed on Nov. 14, 2013, which claims priority from Japanese Patent Application 2013-022846 filed on Feb. 8, 2013, the contents of all of which are incorporated herein by reference, in their entirety.

TECHNICAL FIELD

The present application relates to detection of handover failure, or to adjustment of an HO (handover) parameter based on the detection of the HO (handover) failure.

BACKGROUND ART

In a radio communication system, in moving from a serving cell (source cell) to another cell, a mobile terminal performs switching processing of the serving cell called handover, and continues communication. In order to achieve handover of the mobile terminal, a base station that manages the source cell instructs the mobile terminal to transmit a measurement report when a predetermined event occurs. The predetermined event is, for example, deterioration of radio quality of the source cell. The measurement report generated by the mobile terminal includes measurement results of radio quality of the source cell and its neighboring cells. In response to receiving the measurement report from the mobile terminal, the base station of the source cell determines a cell (target cell) to which a radio link connection switches based on the measurement report, and initiates a handover procedure including signaling with the mobile terminal and the target cell.

Here, introduced is one of transmission events of the measurement report defined by 3GPP TS 36.331 V9.3.0 (2010-06), which is a technical specification regarding LTE (Long Term Evolution)/E-UTRAN (Evolved UTRAN). An essential portion of a reporting event defined as Event A3 (Neighbor becomes offset better than serving) in the above-described literature is expressed by the following Expression (1).

$$P_S + O_S < P_T + O_T \quad (1)$$

$P_S$ in Expression (1) is a measurement result of radio quality of a source cell, and $P_T$ therein is a measurement result of radio quality of a neighboring cell. In a case of LTE, $P_S$ and $P_T$ are downlink RSRP (Reference Signal Received Power) or RSRQ (Reference Signal Received Quality). The RSRQ is a ratio of the RSRP to total received power (RSSI: Received Signal Strength Indicator).

$O_S$ in Expression (1) is an offset value that acts on radio quality of a downlink reference signal of the source cell, and is an HO parameter generally called an a3-offset (or hysteresis). Meanwhile, $O_T$ in Expression (1) is an offset value that acts on radio quality of a downlink reference signal of the neighboring cell, and is an HO parameter generally called a CIO (Cell Individual Offset). A value of the CIO (i.e., $O_T$) may be set to be different for each neighboring cell. The CIO is included in a neighboring list (also called a neighboring cell list) of which the base station notifies mobile terminals connected to a cell managed by the base station itself.

When an operating condition of Expression (1) is set to the base station, the base station informs a mobile terminal, connected to the cell managed by the base station, about the operating condition of Expression (1). When a period in which the condition of Expression (1) is satisfied continues exceeding a predetermined period defined as a guard time (TTT: Time to Trigger), the mobile terminal transmits a measurement report to the base station that manages the source cell. In response to receiving the measurement report from the mobile terminal, the base station decides a target cell based on the measurement report, and initiates handover to the target cell.

However, when the initiation of the handover is too late or too early, a connection failure involving abnormal disconnection of a radio link (hereinafter referred to as RLF (Radio Link Failure)) occurs. In the present description, the connection failure involving RLF caused by inappropriate handover is called "handover failure". Handover optimization or MRO (Mobility Robustness Optimization) is a technology of reducing handover failures by detecting them and adjusting HO parameters, and is one of major use cases of SON (Self-Organizing Network).

For example, Patent Literature 1 discloses a technology of controlling an initiation timing of handover by adjusting HO parameters, such as a3-offset, CIO and TTT in order to suppress handover failure and to increase a success rate of the handover. In addition, Non-Patent Literature 1 defines three types of handover failure involving RLF, i.e., "Too Late Handover", "Too Early Handover", and "Handover to Wrong Cell", and discloses a detection technique thereof.

Too Late Handover corresponds to a situation where a mobile terminal that has experienced RLF in a source cell during execution of a handover procedure tries connection re-establishment (including re-establishment of a radio link) to a target cell, or a situation where a mobile terminal that has experienced RLF in a source cell before initiation of handover tries connection re-establishment to a cell different from the source cell.

Too Early Handover corresponds to a situation where a mobile terminal that has experienced RLF in a target cell during execution of a handover procedure or immediately after completion of handover tries connection re-establishment to a source cell.

Handover to Wrong Cell corresponds to a situation where a mobile terminal that has experienced RLF in a source cell or a target cell during execution of a handover procedure or immediately after completion of handover tries connection re-establishment to a cell different from both the source cell and the target cell.

Non-Patent Literature 1 discloses a technique in which the base station of the source cell detects a plurality of handover failure types by referring to information (i.e., a HANDOVER REPORT message and an RLF INDICATION message) transmitted/received between base stations through an inter-base-station interface (i.e., an X2 interface).

The RLF INDICATION message is transmitted from a base station B to a base station A, when a mobile terminal tries connection re-establishment to the base station B after RLF failure in the base station A. The RLF INDICATION message includes the following information:

Failure Cell ID: an identifier (Physical Cell Identity (PCI)) of a cell to which the mobile terminal had been connected before occurrence of connection failure;

Reestablishment Cell ID: an identifier (E-UTRAN Cell Global Identifier (ECGI)) of a cell to which the mobile terminal tried connection re-establishment; and C-RNTI: an identifier (C-RNTI) of the mobile terminal in the cell to which the mobile terminal had connected before the occurrence of the connection failure.

The HANDOVER REPORT message is generated regarding recently completed handover. The HANDOVER REPORT message is transmitted when handover failure is detected in a target cell immediately after a base station of the target cell transmits a handover completion notification (i.e., a UE Context Release message) to a base station of a source cell. The HANDOVER REPORT message includes the following information:

Type of detected handover failure (i.e., Too Early Handover or Handover to Wrong Cell);
Identifiers (ECGIs) of the source cell and the target cell;
Cell to which connection re-establishment was tried (in a case of Handover to Wrong Cell); and
Handover cause (a content sent from the base station of the source cell during handover preparation).

As will be described below, Non-Patent Literature 1 discloses an outline of a technique of detecting the plurality of handover failure types (i.e., Too Late Handover, Too Early Handover, and Handover to Wrong Cell) by a base station of a source cell.

<Too Late Handover>

A base station of a source cell can detect Too Late Handover by receiving an RLF INDICATION message from a target cell (when handover is initiated) or a cell different from the source cell (when handover is not initiated).

<Too Early Handover>

A base station of a target cell can detect Too Early Handover by receiving, within a predetermined period (Tstore_UE_cntxt) after completion of incoming handover of a mobile terminal (i.e., after transmitting a UE CONTEXT RELEASE message), or while preparing the handover of the mobile terminal, an RLF INDICATION message regarding the mobile terminal from the source cell. In addition, the base station of the source cell can detect Too Early Handover by receiving, from the base station of the target cell, a HANDOVER REPORT message indicating Too Early Handover.

<Handover to Wrong Cell>

The base station of the target cell can detect Handover to Wrong Cell by receiving, within a predetermined period (Tstore_UE_cntxt) after completion of incoming handover of a mobile terminal (i.e., after transmitting a UE CONTEXT RELEASE message), or while preparing the handover of the mobile terminal, an RLF INDICATION message regarding the mobile terminal from a cell different from the source cell. In addition, the base station of the source cell can detect Handover to Wrong Cell by receiving, from the base station of the target cell, a HANDOVER REPORT message indicating Handover to Wrong Cell.

Alternatively, when receiving an attempt for connection re-establishment from a mobile terminal that has experienced RLF in a source cell during handover from the source cell to a target cell, a base station of a neighboring cell different from both the source cell and the target cell may transmit an RLF INDICATION message to the base station of the source cell. Consequently, the base station of the source cell can detect Handover to Wrong Cell by receiving the RLF INDICATION message from the neighboring cell.

CITATION LIST

Patent Literature

[Patent Literature 1] International Application Publication No. WO 2010/002926

Non Patent Literature

[Non-Patent Literature 1] 3GPP TS 36.300 V9.7.0 (2011-03), section 22.4.2, March 2011

SUMMARY OF INVENTION

Technical Problem

As mentioned above, Non-Patent Literature 1 uses information (i.e., HANDOVER REPORT and RLF INDICATION messages) transmitted/received between the base stations through the inter-base-station interface in order that the source cell detects the plurality of handover failure types. However, a situation can be contemplated where information (i.e., HANDOVER REPORT and RLF INDICATION messages) cannot be transmitted between at least some of the base stations for some reason. For example, when the inter-base-station interface cannot be utilized between at least some of the base stations, these base stations cannot transmit/receive a HANDOVER REPORT or RLF INDICATION message. As the situation where the inter-base-station interface cannot be utilized, for example, it can be considered that the inter-base-station interface cannot be utilized between two base stations manufactured by different manufacturers. In addition, it can be considered that the inter-base-station interface cannot be utilized between at least some of the base stations because of an operation policy of a network operator.

If the base station of the target cell cannot transmit/receive information (i.e., HANDOVER REPORT and RLF INDICATION messages) to/from the base station of the source cell and a neighboring base station, it is difficult for the base station of the source cell to detect any of three handover failure types (i.e., Too Late Handover, Too Early Handover, and Handover to Wrong Cell) even with the technique of Non-Patent Literature 1. In addition, if at least one inter-base-station interface of these three base stations cannot be used, it is difficult for the base station of the source cell to detect all the three handover failure types even though a part of them can be detected even with the technique disclosed in Non-Patent Literature 1. Accordingly, there is a possibility that adjustment of HO parameters in consideration of handover failure cannot be sufficiently performed.

One of objects of the present invention is to provide a handover failure detection device, a handover parameter adjustment device, a failure information generation device, a handover optimization system, and method and programs regarding these that contribute to improvement of handover failure detection or reduction of handover failure in a situation where exchange of information between at least some of three base stations (i.e., a base station of a source cell, a base station of a target cell, and their neighboring base station) is restricted (e.g., a situation where an inter-base-station interface cannot be utilized).

Solution to Problem

In a first aspect, a handover failure detection device includes a detection unit. The detection unit operates so as to detect at least one of handover failure types regarding outgoing handover from a first cell managed by a first base station by observing: (a) presence/absence of reception by the first base station of an acknowledgment response to a handover command regarding first handover of a mobile terminal from the first cell to a second cell managed by a second base station; and (b) presence/absence of a request for connection re-establishment from the mobile terminal to the first cell, the request occurring after initiation of the first handover.

In a second aspect, a handover parameter adjustment device includes an adjustment unit. The adjustment unit operates so as to adjust a handover parameter for controlling outgoing handover from a first cell managed by a first base station based on: (a) presence/absence of reception by the first base station of an acknowledgment response to a handover instruction regarding first handover of a mobile terminal from the first cell to a second cell managed by a second base station; and (b) presence/absence of a request for connection re-establishment from the mobile terminal to the first cell, the request occurring after initiation of the first handover.

In a third aspect, a handover failure information generation device includes a generation unit. The generation unit is coupled to a second base station and operates so as to generate handover failure information to be transmitted to a first base station. The handover failure information is used to detect a handover failure type that corresponds to a situation where a mobile terminal has experienced abnormal disconnection in a second cell managed by a second base station during execution of first handover from a first cell managed by the first base station to the second cell or after completion of the first handover, and then tries connection re-establishment to a third cell different from both the first and second cells.

In a fourth aspect, a handover optimization system includes a detection unit and an adjustment unit. The detection unit operates so as to detect at least one of handover failure types regarding outgoing handover from a first cell managed by a first base station by observing: (a) presence/absence of reception by the first base station of an acknowledgment response to a handover command regarding first handover of a mobile terminal from the first cell to a second cell managed by a second base station; and (b) presence/absence of a request for connection re-establishment from the mobile terminal to the first cell, the request occurring after initiation of the first handover. The adjustment unit operates so as to adjust a handover parameter for controlling the outgoing handover from the first cell based on a detection result of the at least one of the handover failure types.

In a fifth aspect, a base station includes the handover failure detection device according to the first aspect described above.

In a sixth aspect, a handover failure detection method includes detecting at least one of handover failure types regarding outgoing handover from a first cell managed by a first base station by observing: (a) presence/absence of reception by the first base station of an acknowledgment response to a handover command regarding first handover of a mobile terminal from the first cell to a second cell managed by a second base station; and (b) presence/absence of a request for connection re-establishment from the mobile terminal to the first cell, the request occurring after initiation of the first handover.

In a seventh aspect, a handover parameter adjustment method includes adjusting a handover parameter for controlling outgoing handover from a first cell managed by a first base station based on: (a) presence/absence of reception by the first base station of an acknowledgment response to a handover command regarding first handover of a mobile terminal from the first cell to a second cell managed by a second base station; and (b) presence/absence of a request for connection re-establishment from the mobile terminal to the first cell, the request occurring after initiation of the first handover.

In an eighth aspect, a program includes instructions to cause a computer to perform a method for handover failure detection. The method includes detecting at least one of handover failure types regarding outgoing handover from a first cell managed by a first base station by observing: (a) presence/absence of reception by the first base station of an acknowledgment response to a handover command regarding first handover of a mobile terminal from the first cell to a second cell managed by a second base station; and (b) presence/absence of a request for connection re-establishment from the mobile terminal to the first cell, the request occurring after initiation of the first handover.

In a ninth aspect, a program includes instructions to cause a computer to perform a method for handover parameter adjustment. The method includes adjusting a handover parameter for controlling outgoing handover from a first cell managed by a first base station based on: (a) presence/absence of reception by the first base station of an acknowledgment response to a handover command regarding first handover of a mobile terminal from the first cell to a second cell managed by a second base station; and (b) presence/absence of a request for connection re-establishment from the mobile terminal to the first cell, the request occurring after initiation of the first handover.

Advantageous Effects of Invention

According to the above-mentioned aspects, it is possible to provide a handover failure detection device, a handover parameter adjustment device, a handover optimization system, and methods and programs related thereto that can contribute to improvement of handover failure detection or reduction of handover failure in a situation where exchange of information between at least some of three base stations (i.e., a base station of a source cell, a base station of a target cell, and their neighboring base station) is restricted.

DESCRIPTION OF EMBODIMENTS

Figure 1:
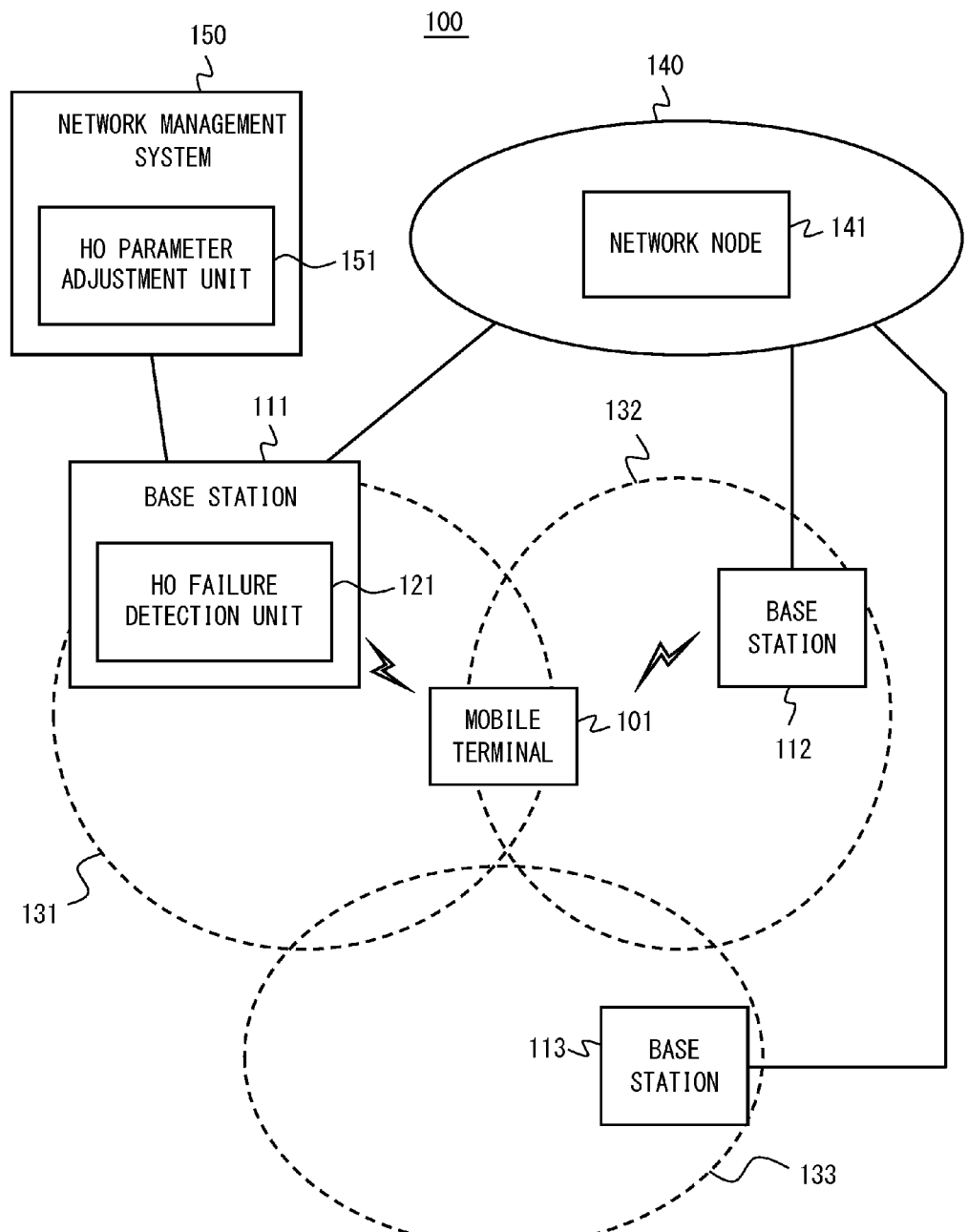
FIG. 1 is a block diagram showing a configuration example of a radio communication system according to first to fifth embodiments.

Hereinafter, specific embodiments will be explained in detail with reference to drawings. Throughout the drawings, the identical and corresponding components are denoted by the same reference symbols, and overlapping explanation is omitted as needed for clarity of explanation.
First Embodiment FIG. 1 is a block diagram showing a configuration example of a radio communication system 100 according to some embodiments including the present embodiment. The radio communication system 100 includes base stations 111 to 113. The base stations 111 to 113 manage cells 131 to 133, respectively, and communicate with one or more mobile terminals (e.g., a mobile terminal 101). The mobile terminal 101 can be connected to any one of the base stations 111 to 113. It is to be noted that the configuration example of FIG. 1 may be appropriately changed since it is merely one example for explanation. For example, the radio communication system 100 may include four or more base stations. In addition, neighborhood relations of the cells 131 to 133 shown in FIG. 1 are also merely one example. For example, the radio communication system 100 may have a hierarchical cell structure in which a certain cell (e.g., the cell 132) is arranged within another cell (e.g., the cell 133).

The base stations 111 to 113 are connected to a network 140 including a network node 141, and can communicate with the network node 141. The network 140 includes, for example, a radio access network or a core network, or both of them. The network node 141 includes a radio access network node or a core network node, or both of them. The network node 141 may correspond to a plurality of network nodes. The network node 141 may be a user plane (data plane) node, or may be a control plane node. The network node 141 executes at least one of radio resource management, mobility management, bearer management, user data forwarding/routing, and a gateway function with an external network.

In addition, the radio communication system 100 includes a handover (HO) failure detection unit 121 and an HO parameter adjustment unit 151. The HO failure detection unit 121 and the HO parameter adjustment unit 151 can be called a system for reducing handover failures (i.e., a handover optimization system). The HO failure detection unit 121 detects at least one of a plurality of handover failure types (e.g., Too Late Handover, Too Early Handover, and Handover to Wrong Cell) regarding outgoing handover from the cell 131 (base station 111). The HO failure detection unit 121 then generates feedback information on the outgoing handover from the source cell 131, and supplies the feedback information to the HO parameter adjustment unit 151. The feedback information is generated based on detection results of the handover failure types, and indicates a detection history of the handover failure types. For example, the feedback information may indicate the number of handover attempts and the detected number for each handover failure type. The feedback information may indicate an occurrence rate for each handover failure type.

The HO parameter adjustment unit 151 adjusts an HO parameter (e.g., at least one of A3-offset, CIO, and TTT) based on the feedback information from the HO failure detection unit 121, i.e., the detection result of the handover failure by the HO failure detection unit 121. The adjusted HO parameter is applied to the cell 131.

In the example shown in FIG. 1, the HO failure detection unit 121 is arranged integrally with the base station 111, and the HO parameter adjustment unit 151 is arranged in a network management system 150. The network management system 150 may be called an OAM (Operation Administration and Maintenance) server, an OMC (Operation and Maintenance Centre), an NM (Network Manager), or an EM (Element Manager) in some cases. However, these arrangements are merely one example. The HO failure detection unit 121 may be arranged away from the base station 111 and so as to be able to communicate with the base station 111. The HO parameter adjustment unit 151 may be arranged integrally with the base station 111, or may be arranged in the network 140.

Hereinafter, detection of a handover failure type regarding handover of the mobile terminal 101 from the cell 131 to the cell 132 is explained. Accordingly, in some cases below, the cell 131 is called a "source cell", and the cell 132 is called a "target cell". The base station 111 is called a "source base station", and the base station 112 is called a "target base station". The cell 133 is called a "neighboring cell" or a "re-connection cell". The base station 113 is called a "neighboring base station" or a "re-connection base station". It is to be noted that the re-connection cell means a cell to which the mobile terminal 101 that has experienced RLF during handover or immediately after completion of the handover requests re-establishment of radio connection.

As already mentioned, in the situation where exchange of information between at least some of three base stations (i.e., the source station 111, the target base station 112, and the neighboring base station 113) is restricted (e.g., a situation where an inter-base-station interface cannot be utilized), there is a possibility that detection of one or more handover failure types regarding the outgoing handover from the cell 131 becomes difficult. In order to address this problem, the HO failure detection unit 121 of the present embodiment detects at least one of handover failure types (e.g., Too Late Handover, Too Early Handover, and Handover to Wrong Cell) regarding the outgoing handover from the cell 131 by observing: (a) presence/absence of reception from the mobile terminal 101 by the source base station 111 of an acknowledgment response to a handover command regarding first handover of the mobile terminal 101 from the source cell 131 to the target cell 132; and (b) presence/absence of a request for connection re-establishment to the source base station 111 from the mobile terminal 101 occurring after initiation of the first handover.

In addition, the HO parameter adjustment unit 151 of the present embodiment adjusts an HO parameter based on a detection result by the HO failure detection unit 121. Accordingly, the HO parameter adjustment unit 151 adjusts the HO parameter for controlling the outgoing handover from the cell 131 based on: (a) the presence/absence of the reception from the mobile terminal 101 by the source base station 111 of the acknowledgment response to the handover command regarding the first handover of the mobile terminal 101 from the source cell 131 to the target cell 132; and (b) the presence/absence of the request for connection re-establishment to the source base station 111 from the mobile terminal 101 occurring after the initiation of the first handover.

Here, the acknowledgment response to the handover command may be transmitted from the mobile terminal 101 to the source base station 111 regardless of a situation in which the inter-base-station interface cannot be utilized or a situation in which the inter-base-station interface can be utilized.

The acknowledgment response to the handover command is a message (signal) that the source base station 111 receives from the mobile terminal 101 during a handover procedure. The acknowledgment response to the handover command may be a message that is transmitted after the mobile terminal 101 normally receives the handover command.

In an LTE system, for example, the acknowledgment response to the handover command may be an acknowledgment response (ACK) to be transmitted to the source base station 111 by the mobile terminal 101 to control a re-transmission of an "HO Command" message (more specifically, an "RRC Connection Reconfiguration" message) transmitted to the mobile terminal 101 from the source base station 111. The acknowledgment response may be a signal indicating that the mobile terminal 101 has accurately received the "HO Command" message in the re-transmission control based on an Automatic Repeat reQuest (ARQ). In another example, the acknowledgment response may be a signal indicating that the mobile terminal 101 has accurately received the "HO Command" message in the re-transmission control based on a Hybrid Automatic Repeat reQuest (HARQ). The re-transmission control and handover procedures are defined by 3GPP TS 36.300.

Initiation of handover may correspond to transmitting a handover command from the source base station 111 to the mobile terminal 101. The mobile terminal 101 that has received the handover command initiates a connection to the target base station 112. Alternatively, the initiation of the handover may correspond to transmitting a handover request for handover preparation from the source base station 111 to the target base station 112 or to the network node 141. The target base station 112 or the network node 141 that has received the handover request initiates the handover preparation including setup of radio resources in the target base station 112. Also, alternatively, the initiation of the handover may correspond to receiving information to trigger the handover (e.g., a measurement report) at the source base station 111 from the mobile terminal 101.

For example, in the LTE system, the initiation of the handover may correspond to transmission of a "HO Command" message from the source base station 111 to the mobile terminal 101. Alternatively, the initiation of the handover may correspond to transmission of a "Handover Request" message from the source base station 111 to the target base station 112. Also, alternatively, the initiation of the handover may correspond to transmission of a "Handover Required" message from the source base station 111 to the network node 141 (specifically, the MME). Further, alternatively, the initiation of the handover may correspond to reception of a Measurement Report at the source base station 111 from the mobile terminal 101. Handover procedures including transmission of the HO Command message, the Handover Request message, and the Measurement Report are defined by 3GPP TS 36.300.

As mentioned above, the HO failure detection unit 121 according to the present embodiment detects a handover failure type based on (a) whether the acknowledgment response to the handover command has been received from the mobile terminal 101, and (b) whether the request for connection re-establishment has been received from the mobile terminal 101. Accordingly, the HO failure detection unit 121 can improve handover failure detection in a situation where exchange of information (e.g., the HANDOVER REPORT message and the RLF INDICATION message) between at least some of the three base stations (i.e., the source base station 111, the target base station 112, and the neighboring base station 113) is restricted. In addition, the HO parameter adjustment unit 151 can contribute to reduction of the handover failure in the above-described situation by utilizing a detection result from the HO failure detection unit 121.

In one example, the HO failure detection unit 121 can detect Too Late Handover or Too Early Handover regarding the outgoing handover from the source cell 131, or both of them without using information from the target base station 112 and the neighboring base station 113. In another example, the HO failure detection unit 121 can detect Handover to Wrong Cell regarding the outgoing handover from the source cell 131 in a situation where information from either one of the target base station 112 and the neighboring base station 113 cannot be utilized. Specific examples of operations of the HO failure detection unit 121 and the HO parameter adjustment unit 151 for detecting each handover failure type (Too Late Handover, Too Early Handover, or Handover to Wrong Cell) will be explained in second to fifth embodiments.

Second Embodiment

Figure 2:
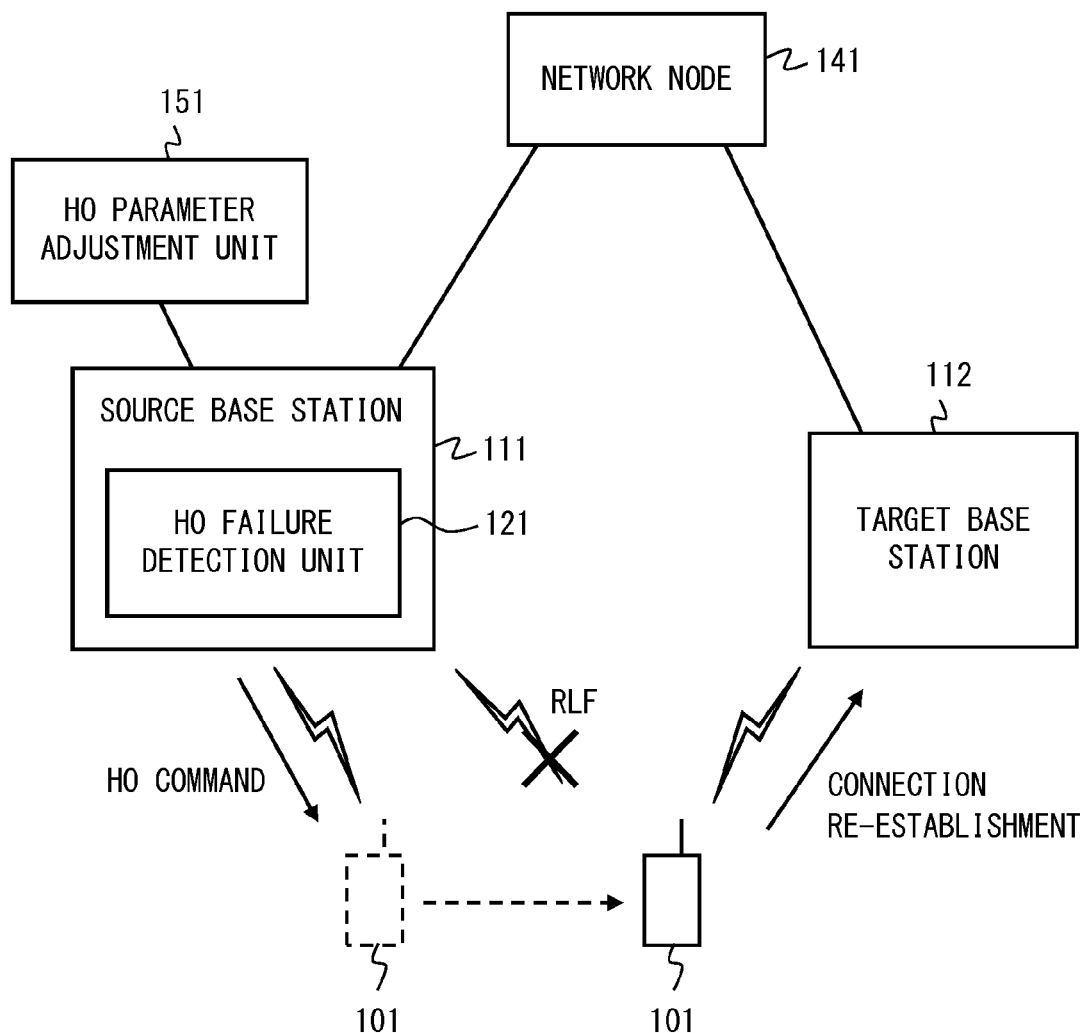
FIG. 2 is a block diagram showing a configuration example of a radio communication system according to the second embodiment.

In the present embodiment, detection of Too Late Handover regarding handover from the source cell 131 to the target cell 132 will be explained. A configuration example of the radio communication system 100 according to the present embodiment is the same as FIG. 1. FIG. 2 shows a situation where Too Late Handover occurs. It is to be noted that FIG. 2 assumes a situation where information (e.g., the HANDOVER REPORT message and the RLF INDICATION message) cannot be transmitted between the source base station 111 and the target base station 112. This situation corresponds for example to a situation that the inter-base-station interface (e.g., the X2 interface) between the source base station 111 and the target base station 112 cannot be utilized.

In FIG. 2, at the beginning, the mobile terminal 101 is connected to the source base station 111 (source cell 131), and performs communication through the source base station 111. Simultaneously, the mobile terminal 101 is located near the target base station 112. The mobile terminal 101, for example, transmits to the source base station 111 a measurement report indicating radio quality of the source cell 131 and the target cell 132 in response to a predetermined condition (e.g., satisfaction of an aperiodic or periodic condition). After that, the source base station 111 decides and initiates outgoing handover of the mobile terminal 101 to the target cell 132 (target base station 112). In the example shown in FIG. 2, the source base station 111 transmits a handover command (e.g., the HO Command message) to the mobile terminal 101 in order to initiate the handover. It is to be noted that as already mentioned above, the initiation of the handover may correspond to transmission of a handover request (e.g., the "Handover Required" message) from the source base station 111 to the network node 141 (e.g., the MME). Alternatively, the initiation of the handover may correspond to reception by the source base station 111 of information (e.g., the Measurement Report) to trigger the handover.

However, the mobile terminal 101 of FIG. 2 experiences RLF in the source cell 131 (source base station 111) before completion of the handover to the target cell 132. The mobile terminal 101 then tries connection re-establishment to the target cell 132. In other words, the mobile terminal 101 transmits a request for connection re-establishment to the target base station 112.

The source base station 111 (i.e., the HO failure detection unit 121) of FIG. 2 detects Too Late Handover without receiving information (e.g., the HANDOVER REPORT message and the RLF INDICATION message) from the target base station 112. Specifically, the HO failure detection unit 121 may detect Too Late Handover when neither an acknowledgment response to the handover command regarding an outgoing handover to the target cell 132 nor a request for connection re-establishment to the source cell 131 is received from the mobile terminal 101 within a predetermined period T1 dependent on the initiation of the outgoing handover. It is to be noted that a predetermined period for reception determination of the acknowledgment response to the handover command may be different from a predetermined period for reception determination of the request for connection re-establishment.

Figure 3:
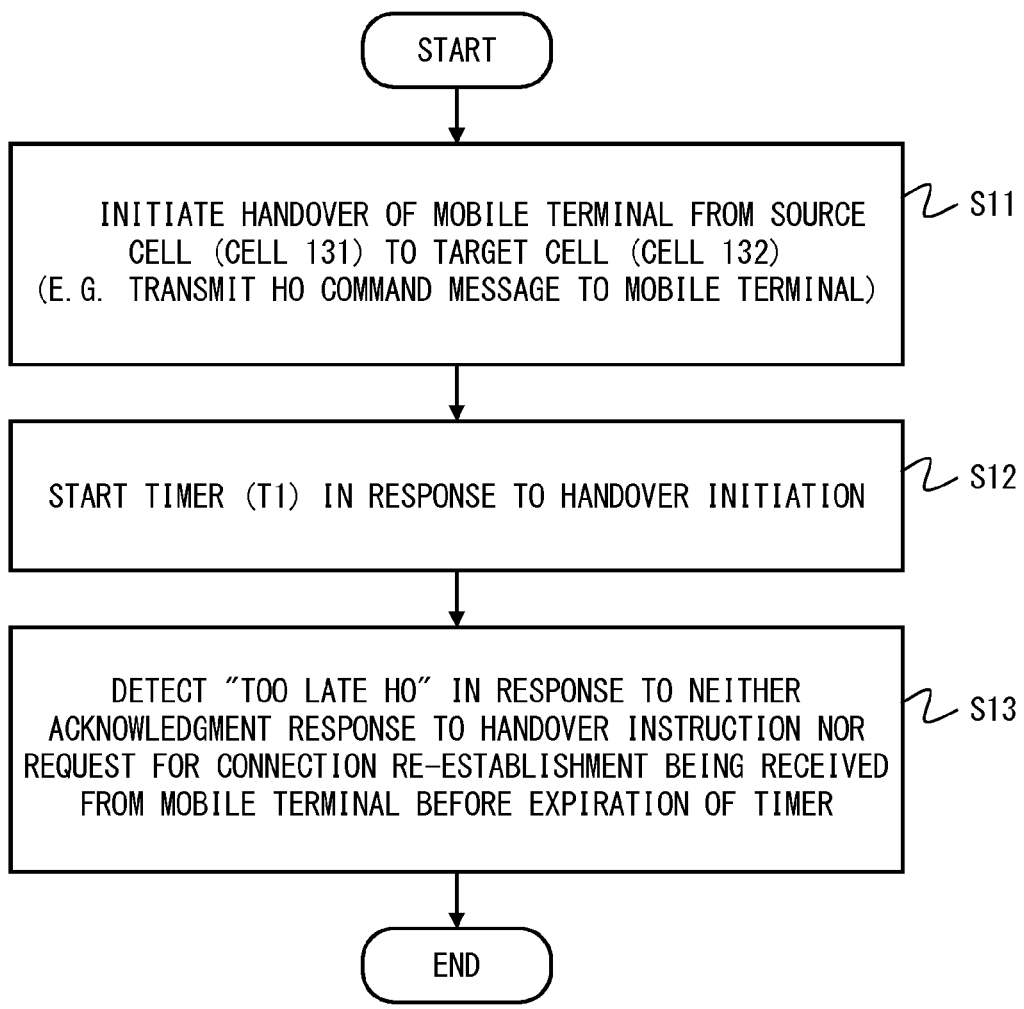
FIG. 3 is a flow chart showing a first example of a Too Late Handover detection procedure according to the second embodiment.

FIG. 3 is a flow chart showing a first example of a Too Late Handover detection procedure. In step S11, the source base station 111 initiates handover of the mobile terminal 101 from the source cell 131 to the target cell 132. Initiation of the handover may be transmission to the mobile terminal 101 of a handover command, may be transmission to the network node 141 of a handover request, or may be reception from the mobile terminal 101 of information to trigger the handover. In step S12, the source base station 111 starts a timer for measuring the predetermined period T1 in response to the handover initiation. In step S13, the source base station 111 (i.e., the HO failure detection unit 121) detects that the handover having been attempted regarding the mobile terminal 101 is Too Late Handover, in response to receiving, before expiration of the timer, neither an acknowledgment response from the mobile terminal 101 to the handover command nor a request for connection re-establishment from the mobile terminal 101.

Figure 4:
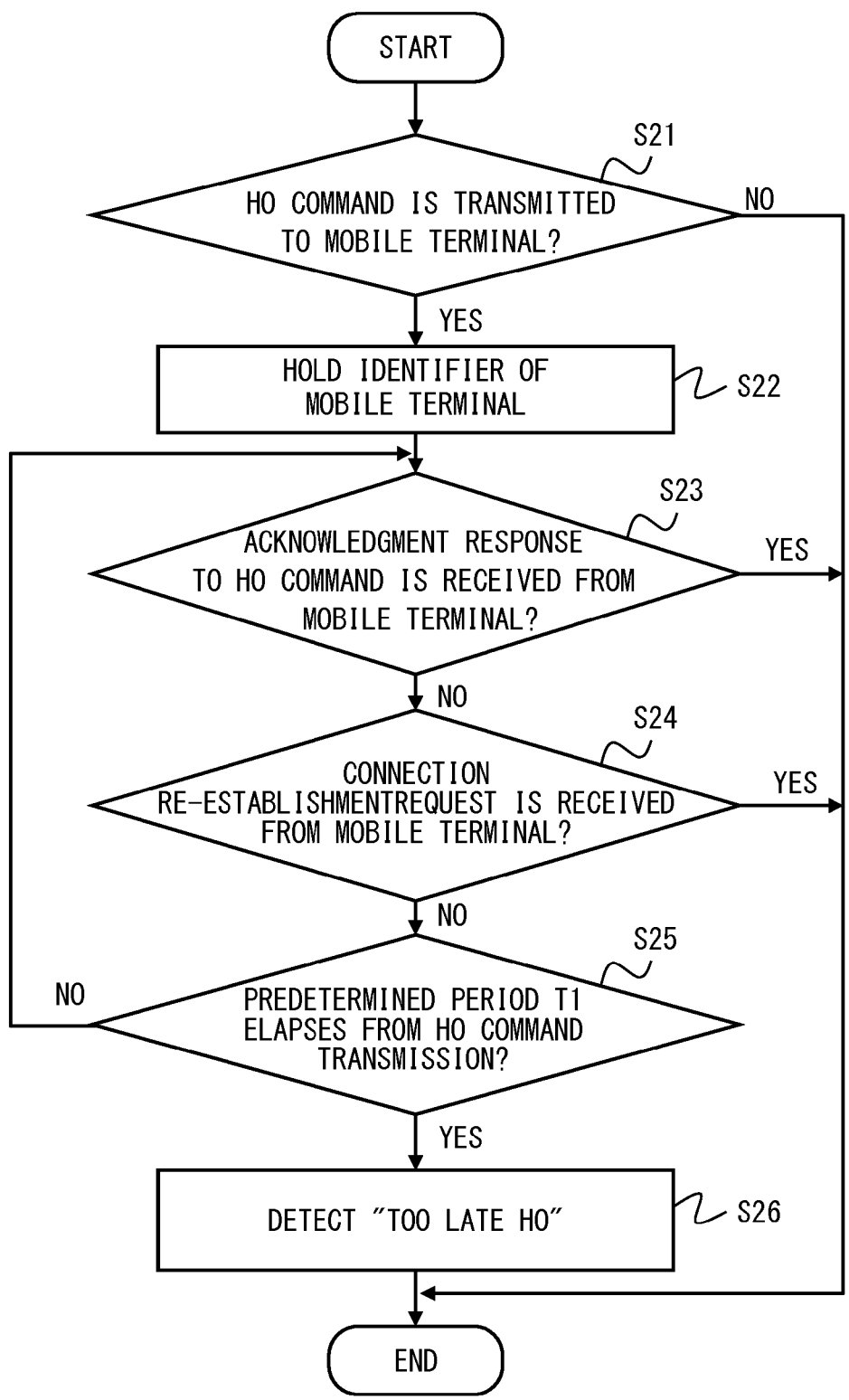
FIG. 4 is a flow chart showing a second example of a Too Late Handover detection procedure according to the second embodiment.

FIG. 4 is a flow chart showing a second example of a Too Late Handover detection procedure. In step S21, the HO failure detection unit 121 determines whether or not a handover command (e.g., the HO Command message) has been transmitted from the source cell 131 (source base station 111) to the mobile terminal 101. If the handover command is transmitted (YES in step S21), the HO failure detection unit 121 acquires and holds an identifier (e.g., a C-RNTI) of the mobile terminal 101 (i.e., a transmission destination of the handover command) (step S22). In step S23, the HO failure detection unit 121 determines whether or not the acknowledgment response to the handover command regarding the outgoing handover of the mobile terminal 101 has been received. If the acknowledgment response to the handover command is not received (YES in step S23), the HO failure detection unit 121 determines whether or not the request for connection re-establishment from the mobile terminal 101 to the source cell 131 has been received (step S24). If neither the acknowledgment response to the handover command nor the re-establishment request is received (NO in step S24), the HO failure detection unit 121 determines whether or not the predetermined period T1 has elapsed since transmission of the handover command (e.g., the HO Command message) (step S25). Subsequently, if the predetermined period T1 has elapsed (YES in step S25), the HO failure detection unit 121 detects that the handover having been attempted regarding the mobile terminal 101 is Too Late Handover (step S26).

Figure 5:
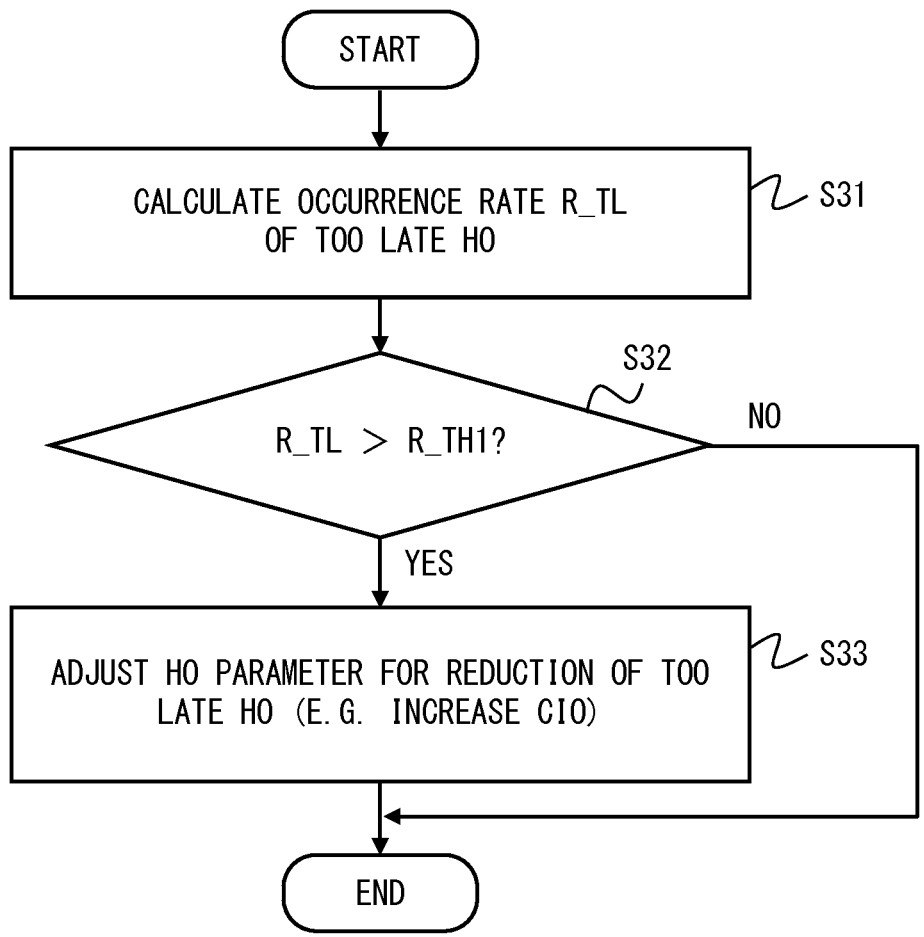
FIG. 5 is a flow chart showing one example of an HO parameter adjustment procedure according to the second embodiment.

FIG. 5 is a flow chart showing one example of an HO parameter adjustment procedure by the HO parameter adjustment unit 151. In step S31, the HO parameter adjustment unit 151 calculates an occurrence rate R_TL of Too Late Handover regarding handovers from the source cell 131 to the target cell 132 based on feedback information received from the HO failure detection unit 121. The feedback information, for example, includes handover statistical information, such as the detected number of Too Late Handovers and the number of handover attempts for each neighboring cell including the target cell 132. The occurrence rate R_TL of Too Late Handover may be a value obtained by dividing the detected number of Too Late Handovers by the number of attempts of outgoing handover from the source cell 131. When the occurrence rate R_TL of Too Late Handover is larger than a predetermined threshold value R_TH1, the HO parameter adjustment unit 151 adjusts an HO parameter in order to reduce Too Late Handover (steps S32 and S33). In the adjustment of the HO parameter of step S33, the CIO that acts on radio quality of the target cell 132 may be increased by a predetermined step size. In addition or alternatively, the TTT applied to the source cell 131 may be decreased by a predetermined step size. In addition or alternatively, the A3-offset that acts on radio quality of the source cell 131 may be decreased by a predetermined step size.

As is understood from the above explanation, the HO failure detection unit 121 according to the present embodiment can detect Too Late Handover without receiving information (e.g., the HANDOVER REPORT message and the RLF INDICATION message) from the target base station 112. In addition, the HO parameter adjustment unit 151 can adjust an HO parameter for reducing Too Late Handover regardless of reception of the information (e.g., the HANDOVER REPORT message and the RLF INDICATION message) from the target base station 112.

It is to be noted that Too Late Handover detected by a technique explained by the present embodiment can include a part of Handover to Wrong Cell. In other words, the technique explained by the present embodiment cannot distinguish between Too Late Handover and a part of Handover to Wrong Cell. However, the part of Handover to Wrong Cell can be reduced by adjustment of an HO parameter (e.g., decrease of the A3-offset applied to the source cell 131) similarly to the adjustment for reducing Too Late Handover. In this case, even if the part of Handover to Wrong Cell cannot be strictly distinguished, handover failure including Handover to Wrong Cell can be appropriately reduced.

In addition or alternatively, when an occurrence rate of Too Late Handover does not decrease even though adjustment of an HO parameter for reducing Too Late Handover has been performed, the HO parameter adjustment unit 151 may perform HO parameter adjustment for reducing Handover to Wrong Cell. For example, the HO parameter adjustment for reducing Handover to Wrong Cell may include adjustment in an opposite direction of the HO parameter adjustment for reducing Too Late Handover, for example, decrease in the CIO that acts on the radio quality of the target cell 132, increase in the TTT applied to the source cell 131, or increase in the A3-offset that acts on the radio quality of the source cell 131. In addition or alternatively, the HO parameter adjustment may include increase of the CIO that acts on radio quality of a neighboring cell (e.g., the cell 133) of the source cell 131 excluding the target cell 132. Consequently, even if the part of Handover to Wrong Cell cannot be strictly distinguished, handover failure including Handover to Wrong Cell can be appropriately reduced.

As described above, the technique explained in the present embodiment can sufficiently contribute to reduction of handover failures, even if the part of Handover to Wrong Cell cannot be distinguished. However, when the source base station 111 can communicate with either the target base station 112 or the neighboring base station 113, the part of Handover to Wrong Cell can also be detected in distinction from Too Late Handover. This technique will be explained in fourth and fifth embodiments later.

Third Embodiment

Figure 6:
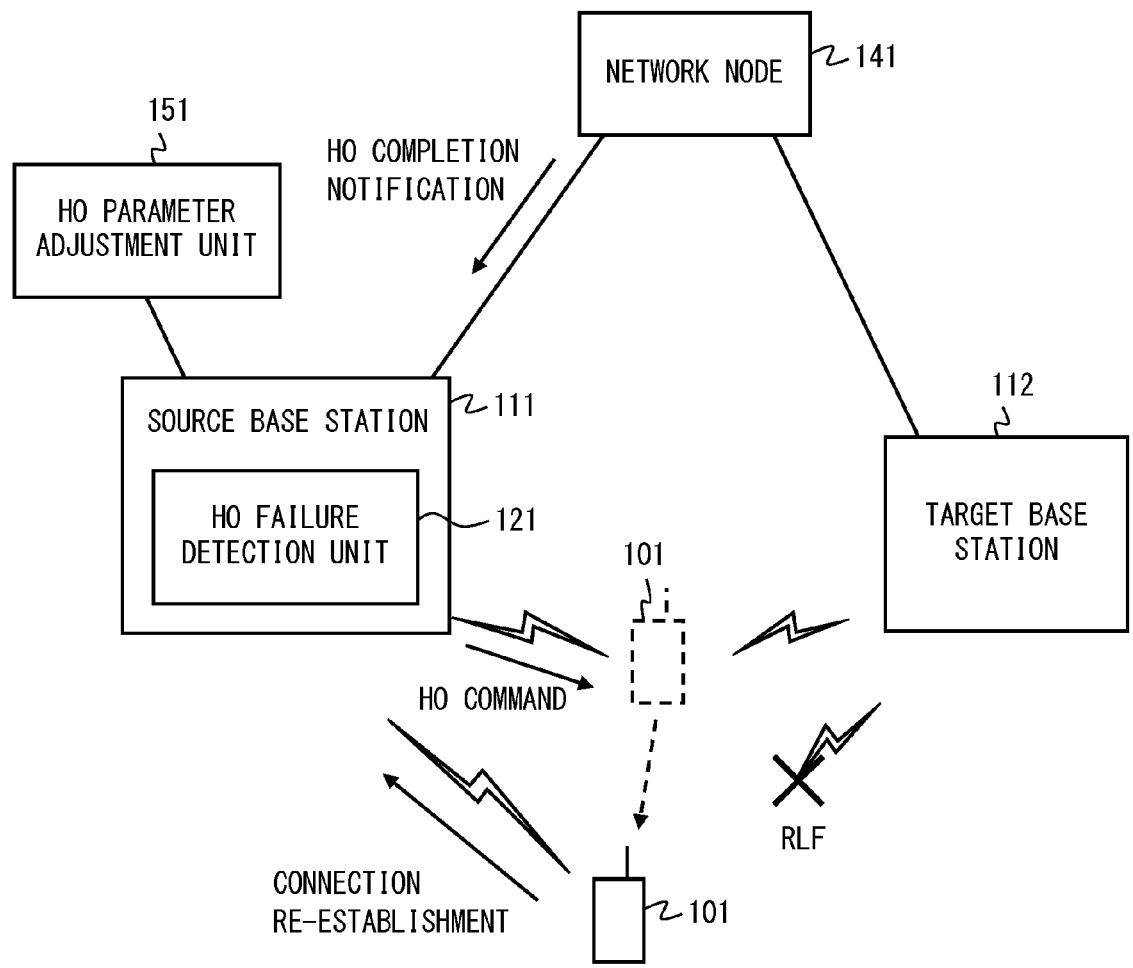
FIG. 6 is a block diagram showing a configuration example of a radio communication system according to the third embodiment.

In the present embodiment, detection of Too Early Handover regarding handover from the source cell 131 to the target cell 132 will be explained. A configuration example of the radio communication system 100 according to the present embodiment is the same as FIG. 1. FIG. 6 shows a situation where Too Early Handover occurs. Too Early Handover corresponds to a situation where the mobile terminal 101 that has experienced RLF in the target cell 132 (base station 112) during execution of the handover procedure or immediately after completion of the handover tries connection re-establishment to the source cell 131 (base station 111). It is to be noted that FIG. 6 assumes a situation where information (e.g., the HANDOVER REPORT message and the RLF INDICATION message) cannot be transmitted between the source base station 111 and the target base station 112. This situation, for example, corresponds to a situation that the inter-base-station interface (e.g., the X2 interface) between the source base station 111 and the target base station 112 cannot be utilized.

In FIG. 6, at the beginning, the mobile terminal 101 is connected to the source base station 111 (source cell 131), and performs communication through the source base station 111. Simultaneously, the mobile terminal 101 is located near the target base station 112. After that, the source base station 111 decides and initiates outgoing handover of the mobile terminal 101 to the target cell 132 (target base station 112). In the example of FIG. 6, the source base station 111 transmits a handover command (e.g., the HO Command message) to the mobile terminal 101 in order to initiate the handover. As already mentioned, the initiation of the handover may correspond to transmission of a handover request (e.g., the "Handover Required" message) from the source base station 111 to the network node 141 (e.g., the MME). Alternatively, the initiation of the handover may correspond to reception by the source base station 111 of information (e.g., the Measurement Report) to trigger the handover.

Subsequently, the source base station 111 receives a handover completion notification (e.g., the "UE Context Release Command" message from the MME) transmitted in response to completion of the handover of the mobile terminal 101 to the target cell 132. However, the mobile terminal 101 experiences RLF in the target cell 132 immediately after completion of the handover. After that, the mobile terminal 101 detects that radio quality of the source cell 131 is good, and transmits a request for connection re-establishment to the source cell 131 (source base station 111). It is to be noted that the mobile terminal 101 may experience RLF in the target cell 132 during the execution of the handover to the target cell 132 in some cases. In this case, the handover completion notification shown in FIG. 6 is transmitted to the source base station 111 after the connection re-establishment of the mobile terminal 101 to the target cell 132 is completed.

The source base station 111 (i.e., the HO failure detection unit 121) of FIG. 6 detects Too Early Handover without receiving information (e.g., the HANDOVER REPORT message and the RLF INDICATION message) from the target base station 112. As a first example, the HO failure detection unit 121 may detect Too Early Handover when a request for connection re-establishment from the mobile terminal 101 to the source cell 131 (source base station 111) is received within a predetermined period T2 dependent on the initiation of the outgoing handover of the mobile terminal 101. As a second example, the HO failure detection unit 121 may detect Too Early Handover when a request for connection re-establishment from the mobile terminal 101 to the source cell 131 (source base station 111) is received after the initiation of the outgoing handover of the mobile terminal 101 and before the completion of the handover (e.g., before the reception of the handover completion notification). As a third example, the HO failure detection unit 121 may detect Too Early Handover when a request for connection re-establishment from the mobile terminal 101 to the source cell 131 (source base station 111) is received within a predetermined period T3 dependent on the completion of the handover (e.g., the reception of the handover completion notification).

Figure 7:
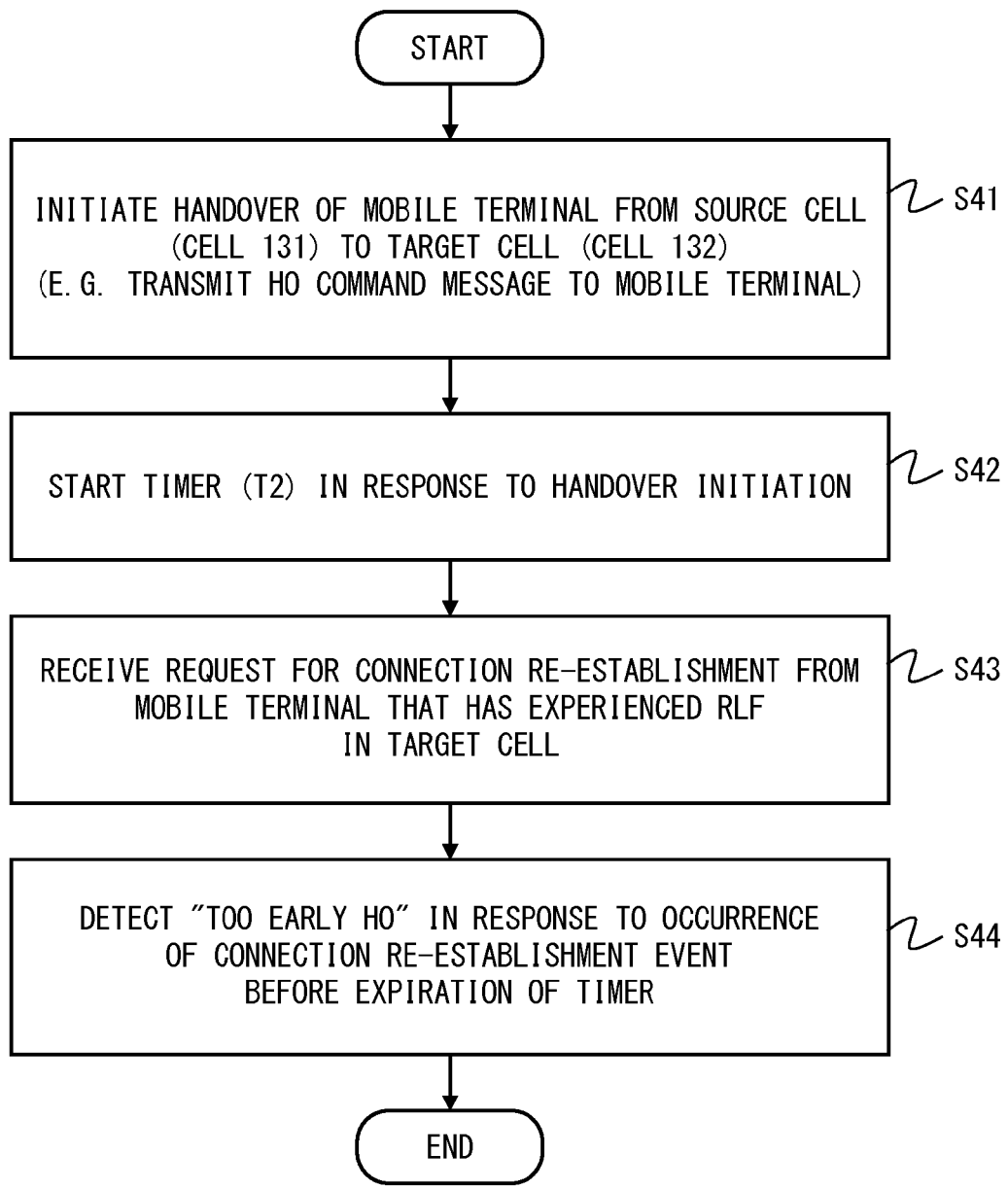
FIG. 7 is a flow chart showing a first example of a Too Early Handover detection procedure according to the third embodiment.

FIG. 7 is a flow chart showing a first example of a Too Early Handover detection procedure. In step S41, the source base station 111 initiates handover of the mobile terminal 101 from the source cell 131 to the target cell 132. Initiation of the handover may be transmission to the mobile terminal 101 of a handover command, may be transmission to the network node 141 of a handover request, or may be reception from the mobile terminal 101 of information to trigger the handover. In step S42, the source base station 111 starts a timer for measuring the predetermined period T2 in response to the handover initiation. In step S43, the source base station 111 receives a request for connection re-establishment from the mobile terminal 101 that has experienced RLF in the target cell 132. In step S44, the source base station 111 (i.e., the HO failure detection unit 121) detects that the handover having been attempted regarding the mobile terminal 101 is Too Early Handover, in response to occurrence of a connection re-establishment event of the mobile terminal 101 in the source cell 131 (source base station 111) before expiration of the timer.

Figure 8:
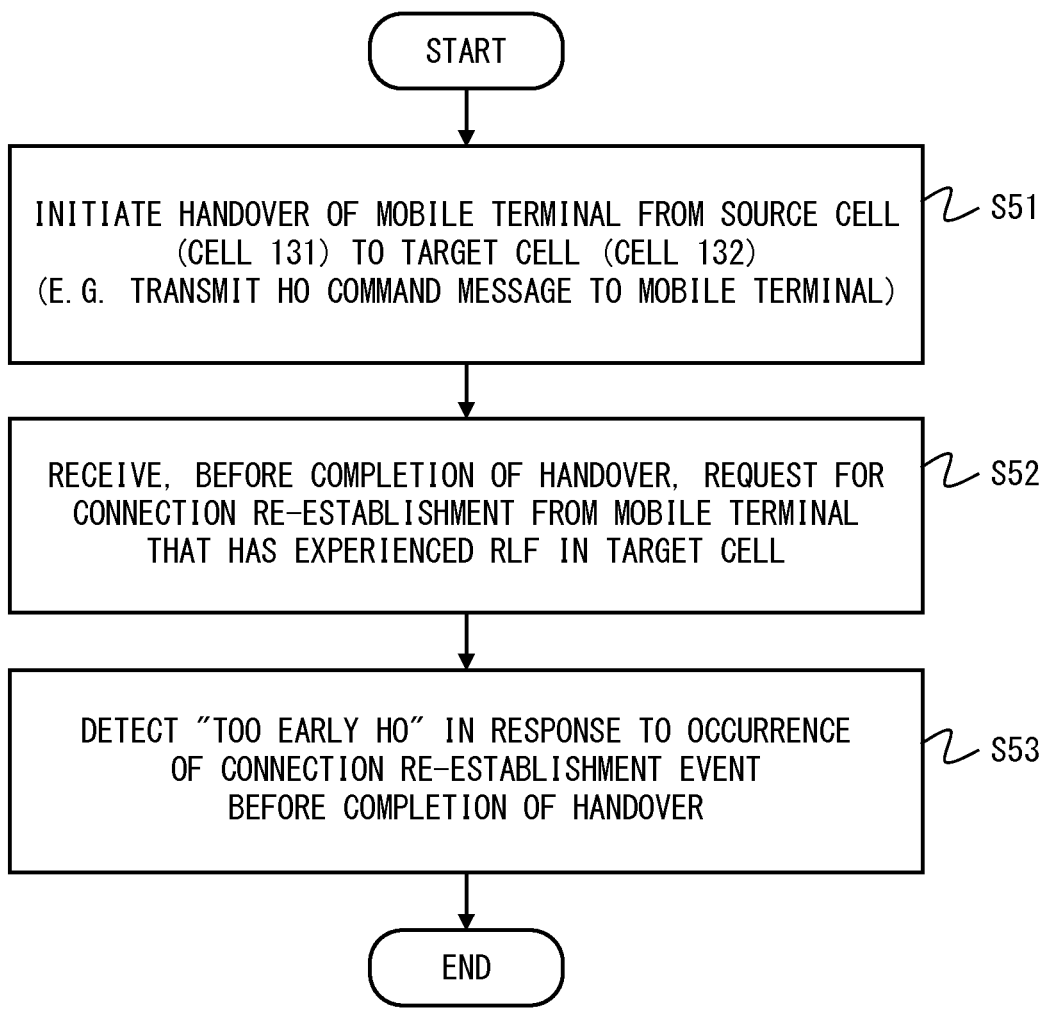
FIG. 8 is a flow chart showing a second example of a Too Early Handover detection procedure according to the third embodiment.

FIG. 8 is a flow chart showing a second example of a Too Early Handover detection procedure. Step S51 is to the same as step S41 of FIG. 7. Namely, in step S51, the source base station 111 initiates handover of the mobile terminal 101 from the source cell 131 to the target cell 132. In step S52, the source base station 111 receives, after initiation of the outgoing handover of the mobile terminal 101 and before completion thereof, a request for connection re-establishment from the mobile terminal 101 that has experienced RLF in the target cell 132. In step S53, the source base station 111 (i.e., the HO failure detection unit 121) detects that the handover having been attempted regarding the mobile terminal 101 is Too Early Handover, in response to receiving the request for connection re-establishment from the mobile terminal 101 after the initiation of the outgoing handover of the mobile terminal 101 and before the completion thereof.

Figure 9:
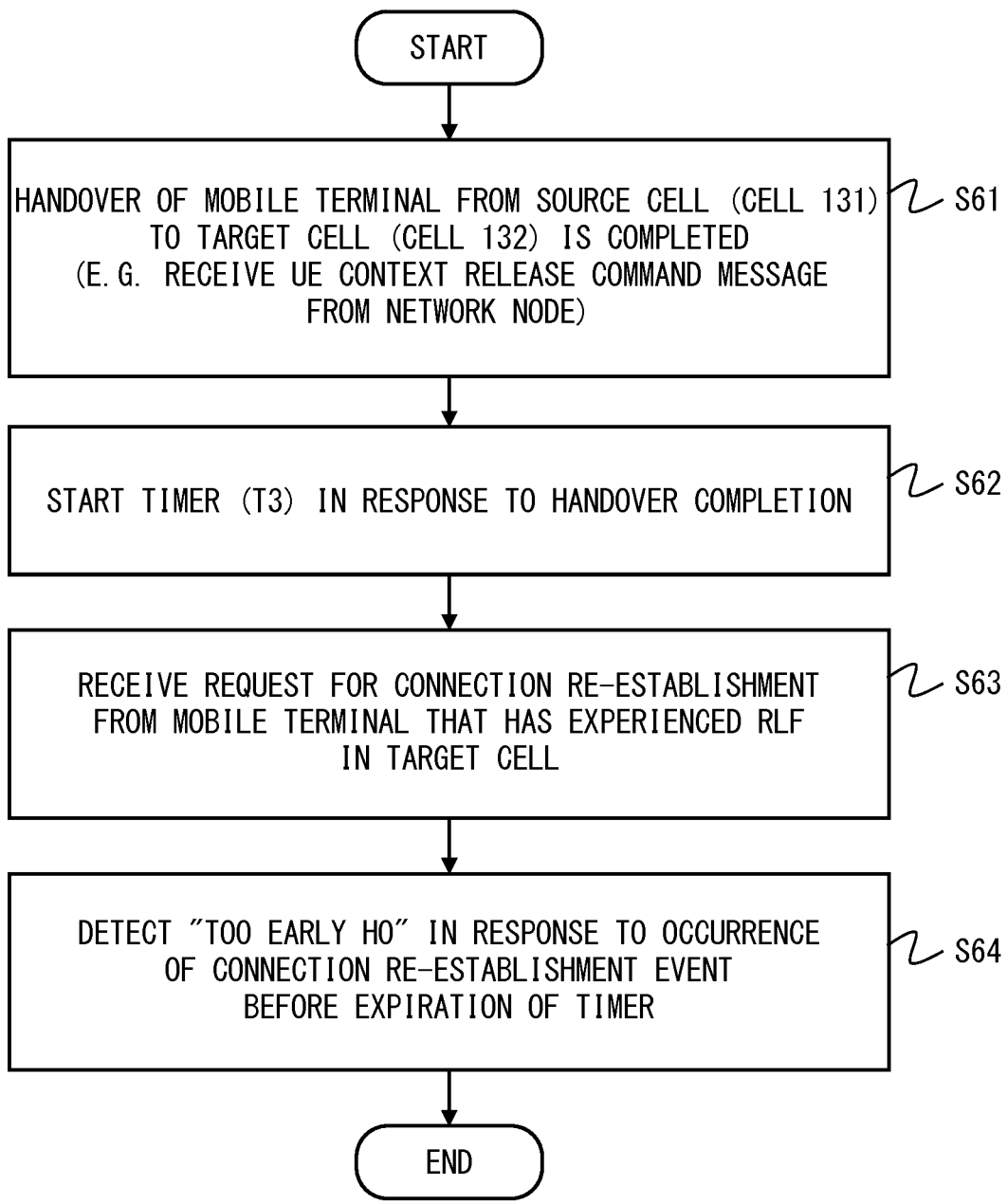
FIG. 9 is a flow chart showing a third example of a Too Early Handover detection procedure according to the third embodiment.

FIG. 9 is a flow chart showing a third example of a Too Early Handover detection procedure. In step S61, handover of the mobile terminal 101 from the source cell 131 to the target cell 132 is completed. For example, the source base station 111 receives a handover completion notification (e.g., the UE Context Release Command message) from the network node 141. In step S62, the source base station 111 starts a timer for measuring the predetermined period T3 in response to the handover completion. In step S63, the source base station 111 receives a request for connection re-establishment from the mobile terminal 101 that has experienced RLF in the target cell 132. In step S64, the source base station 111 (i.e., the HO failure detection unit 121) detects that the handover having been attempted regarding the mobile terminal 101 is Too Early Handover, in response to occurrence of a connection re-establishment event of the mobile terminal 101 in the source cell 131 (source base station 111) before expiration of the timer.

Figure 10:
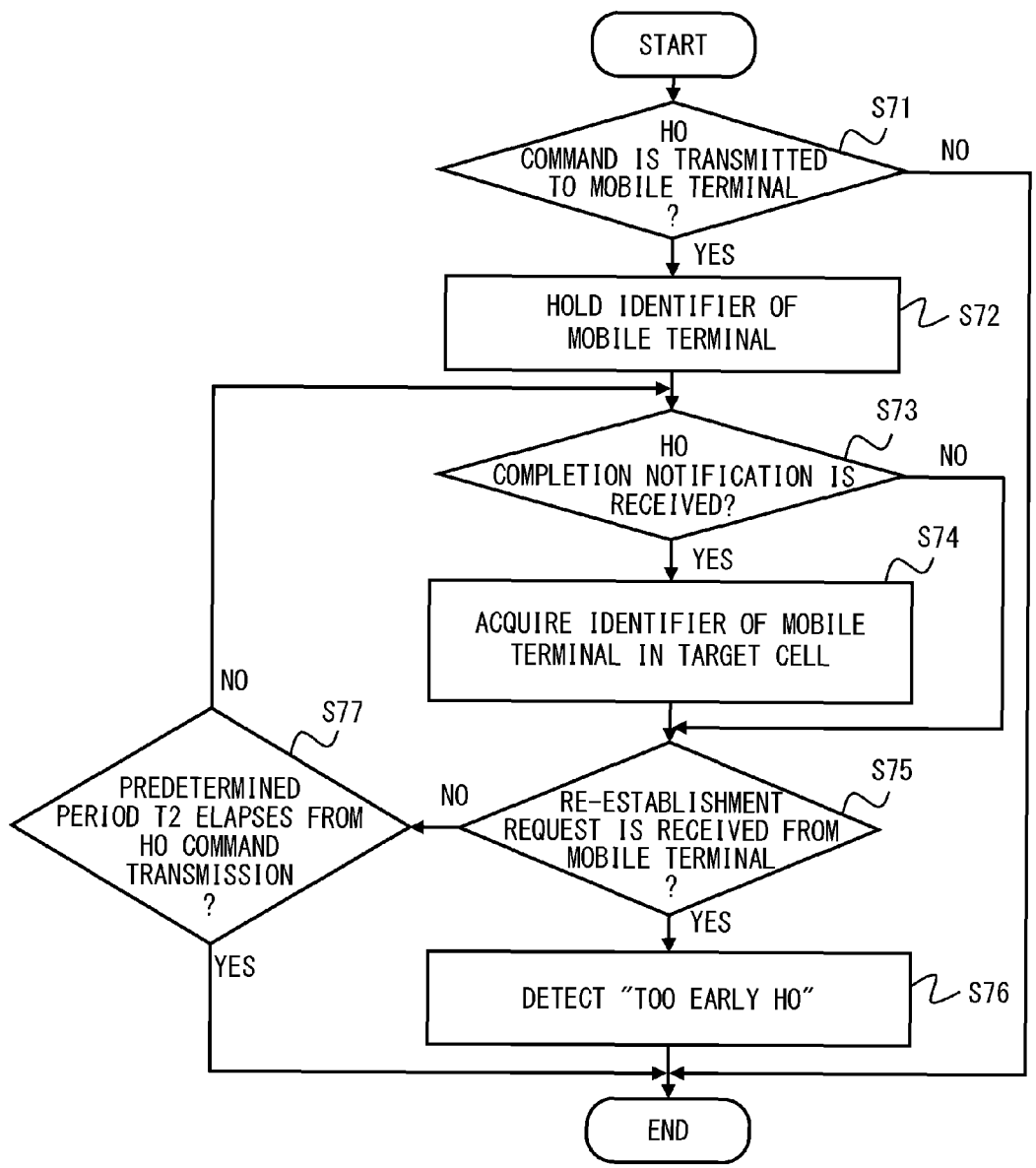
FIG. 10 is a flow chart showing a fourth example of a Too Early Handover detection procedure according to the third embodiment.

FIG. 10 is a flow chart showing a fourth example of a Too Early Handover detection procedure. In step S71, the HO failure detection unit 121 determines whether or not a handover command (e.g., the HO Command message) has been transmitted from the source cell 131 (source base station 111) to the mobile terminal 101. If the handover command is transmitted (YES in step S21), the HO failure detection unit 121 acquires and holds an identifier (e.g., the C-RNTI) of the mobile terminal 101 (i.e., a transmission destination of the handover command) (step S72). In step S73, the HO failure detection unit 121 determines whether or not a handover completion notification regarding the outgoing handover of the mobile terminal 101 has been received. If the handover completion notification is received (YES in step S73), the HO failure detection unit 121 acquires and holds an identifier (e.g., the C-RNTI) of the mobile terminal 101 in the target cell 132 (step S74). The identifier of the mobile terminal 101 in the target cell 132 (i.e., the identifier allocated to the mobile terminal 101 by the target cell 132) can be acquired, for example, by referring to the handover command (e.g., the HO Command message) that the source base station 111 has received from the network node 141 immediately before step S71.

In step S75, the HO failure detection unit 121 determines whether or not a request for connection re-establishment from the mobile terminal 101 to the source cell 131 has been received. If the request for connection re-establishment is received (YES in step S75), the HO failure detection unit 121 detects that the handover having been attempted regarding the mobile terminal 101 is Too Early Handover (step S76). Meanwhile, if the request for connection re-establishment is not received (NO in step S75), the HO failure detection unit 121 repeats reception determination of the request for connection re-establishment until the predetermined period T2 elapses since the initiation of the handover (step S77).

It is to be noted that in step S75, the identifier held in step S72 or S74 may just be checked with an identifier included in the request for connection re-establishment in order to determine whether the mobile terminal that has sent the request for connection re-establishment is identical with the mobile terminal that has attempted the outgoing handover to the target cell 132. As is understood from this, steps S73 and S74 are performed to change the terminal identifier to be checked with the request for connection re-establishment before and after completion of the handover. Accordingly, when the terminal identifier that does not change before and after the completion of the handover can be utilized for the check, processing of steps S73 and S74 may be omitted.

Figure 11:
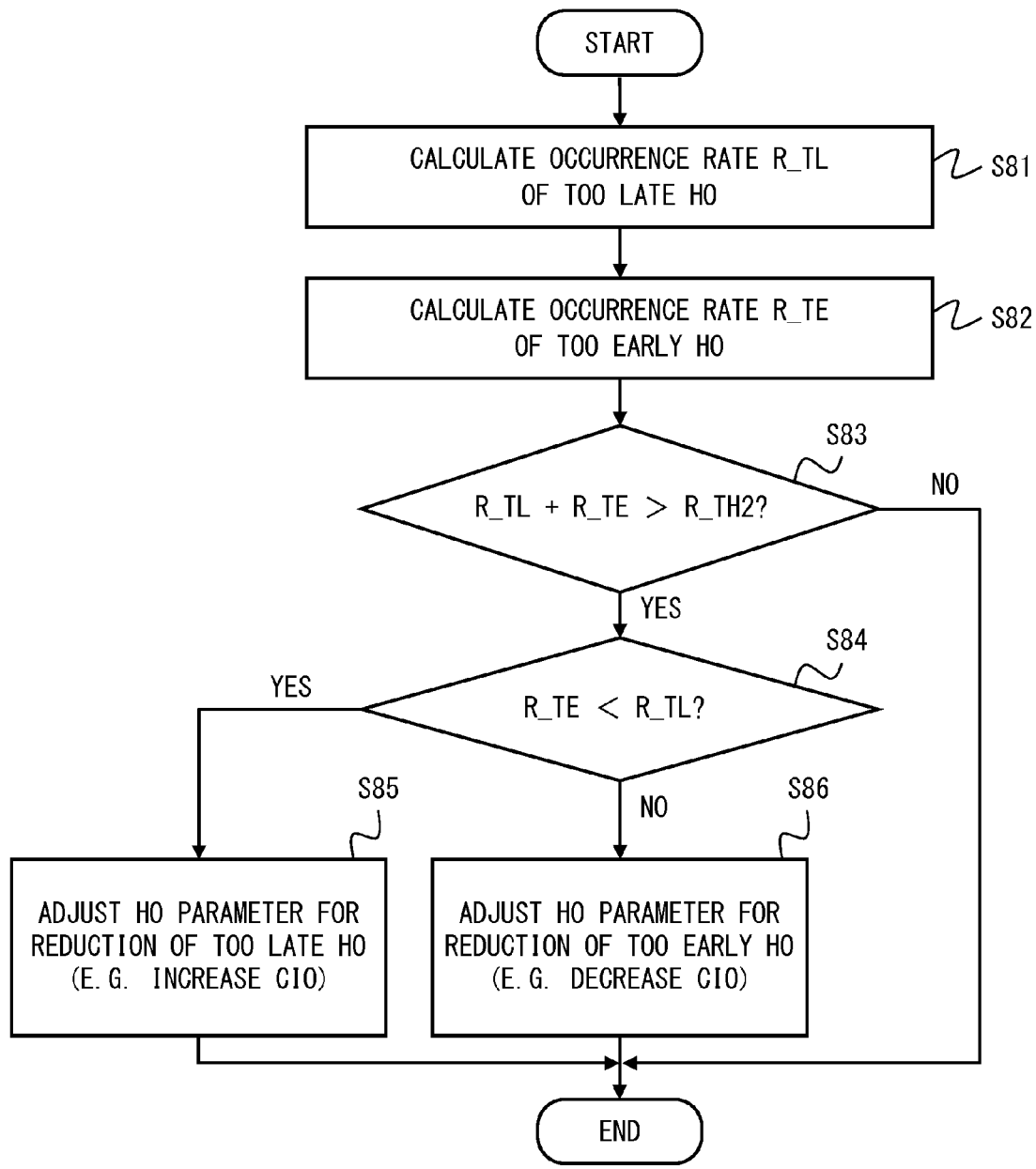
FIG. 11 is a flow chart showing one example of an HO parameter adjustment procedure according to the third embodiment.

FIG. 11 is a flow chart showing one example of an HO parameter adjustment procedure performed by the HO parameter adjustment unit 151. In the example of FIG. 11, the HO parameter adjustment unit 151 adjusts an HO parameter in response to detection of Too Late Handover and Too Early Handover. Too Late Handover may be detected in accordance with the above-mentioned second embodiment. In step S81, the HO parameter adjustment unit 151 calculates the occurrence rate R_TL of Too Late Handover regarding the handover from the source cell 131 to the target cell 132 similarly to step S31 of FIG. 5. In step S82, the HO parameter adjustment unit 151 calculates the occurrence rate R_TE of Too Early Handover regarding the handover from the source cell 131 to the target cell 132 based on feedback information received from the HO failure detection unit 121. The feedback information, for example, includes handover statistical information, such as the detected number of Too Late Handovers, the detected number of Too Early Handovers, and the number of handover attempts for each neighboring cell including the target cell 132. The occurrence rate R_TE of Too Early Handover may be a value obtained by dividing the detected number of Too Early Handovers by the number of attempts of the outgoing handover from the source cell 131.

The HO parameter adjustment unit 151 adjusts an HO parameter when a sum of the R_TL and the R_TE is larger than a predetermined threshold value R_TH2 (step S83). Specifically, if the occurrence rate R_TL of Too Late Handover is larger than the occurrence rate R_TE of Too Early Handover (YES in step S84), HO parameter adjustment for reduction of Too Late Handover is performed (step S85). In contrast with this, if the occurrence rate R_TE of Too Early Handover is not less than the occurrence rate R_TL of Too Late Handover (NO in step S84), the HO parameter adjustment for the reduction of Too Early Handover is performed (step S86). In the adjustment of the HO parameter in step S86, the CIO that acts on radio quality of the target cell 132 may be decreased by a predetermined step size. In addition or alternatively, the TTT applied to the source cell 131 may be increased by a predetermined step size. In addition or alternatively, the A3-offset that acts on radio quality of the source cell 131 may be increased by a predetermined step size. It is to be noted that in step S85, adjustment may be performed so as to increase or decrease the HO parameter in an opposite direction of step S86.

As is understood from the above explanation, the HO failure detection unit 121 according to the present embodiment can detect Too Early Handover without receiving information (e.g., the HANDOVER REPORT message and the RLF INDICATION message) from the target base station 112. In addition, the HO parameter adjustment unit 151 can adjust the HO parameter for the reduction of Too Early Handover regardless of reception of information (e.g., the HANDOVER REPORT message and the RLF INDICATION message) from the target base station 112.

Fourth Embodiment

Figure 12:
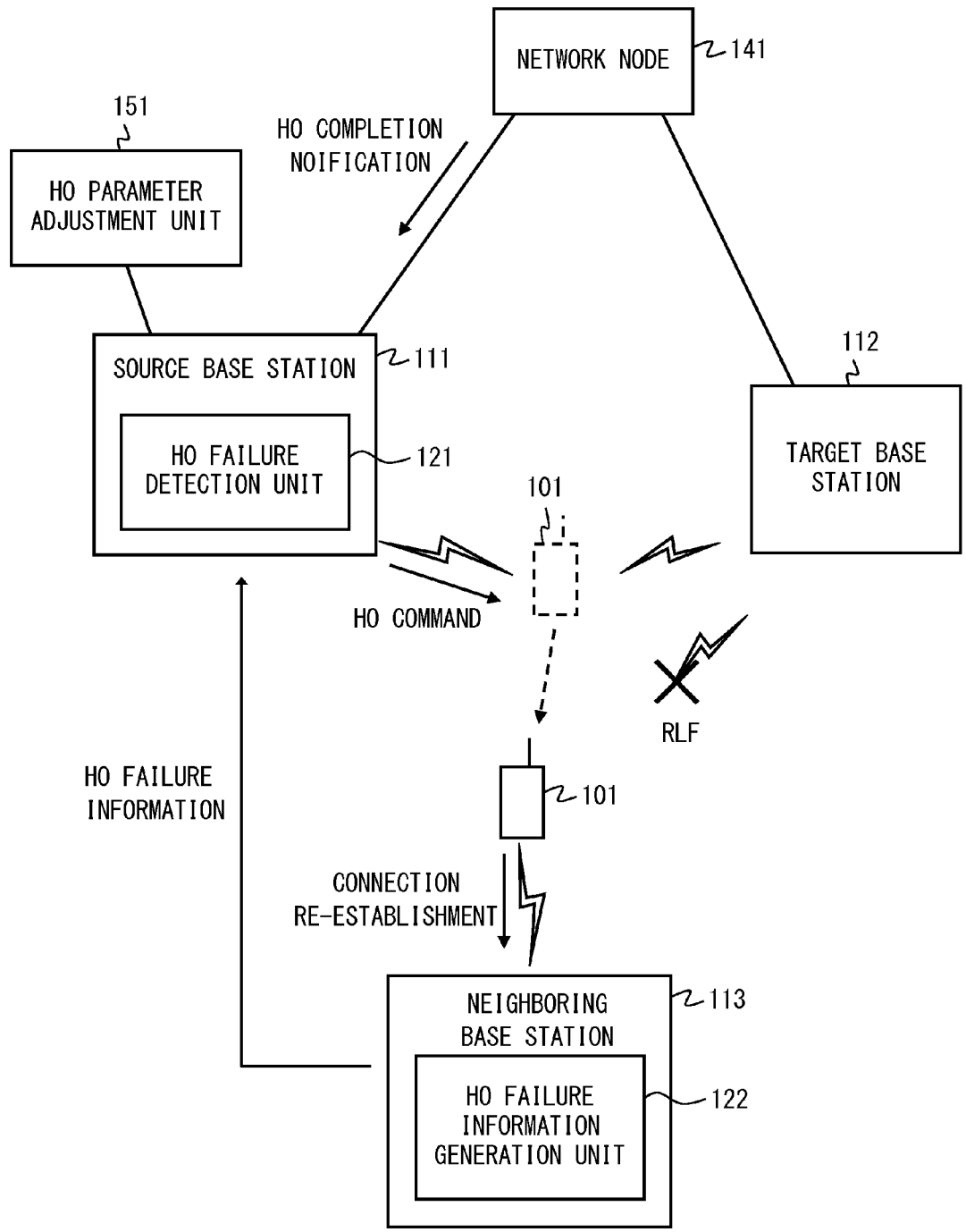
FIG. 12 is a block diagram showing a configuration example of a radio communication system according to the fourth embodiment.

In the present embodiment, detection of Handover to Wrong Cell regarding the handover from the source cell 131 to the target cell 132 will be explained. A configuration example of the radio communication system 100 according to the present embodiment is the same as FIG. 1. FIG. 12 shows a situation where Handover to Wrong Cell occurs. It is to be noted that FIG. 12 assumes a situation where the target base station 112 cannot transmit or receive information (e.g., the HANDOVER REPORT message and the RLF INDICATION message) to or from other two base stations (i.e., the source base station 111 and the neighboring base station 113). Meanwhile, the source base stations 111 can communicate with the neighboring base station 113, and receives handover (HO) failure information from the neighboring base station 113. The HO failure information may be transmitted via an inter-base-station interface (e.g., the X2 interface) between the source base station 111 and the neighboring base station 113, or may be transmitted via the network 140.

In FIG. 12, at the beginning, the mobile terminal 101 is connected to the source base station 111 (source cell 131), and performs communication through the source base station 111. Simultaneously, the mobile terminal 101 is located near the target base station 112 and the neighboring base station 113. After that, the source base station 111 decides and initiates outgoing handover of the mobile terminal 101 to the target cell 132 (target base station 112). In the example of FIG. 12, the source base station 111 transmits a handover command (e.g., the HO Command message) to the mobile terminal 101 in order to initiate the handover. As already mentioned, the initiation of the handover may correspond to transmission of a handover request (e.g., the "Handover Required" message) from the source base station 111 to the network node 141 (e.g., the MME). Alternatively, the initiation of the handover may correspond to reception by the source base station 111 of information (e.g., the Measurement Report) to trigger the handover.

Subsequently, the source base station 111 receives a handover completion notification (e.g., the "UE Context Release Command" message from the MME) transmitted in response to completion of the handover of the mobile terminal 101 to the target cell 132. However, the mobile terminal 101 experiences RLF in the target cell 132 immediately after completion of the handover. After that, the mobile terminal 101 detects that radio quality of the neighboring cell 133 is good, and transmits a request for connection re-establishment to the neighboring cell 133 (neighboring base station 113). It is to be noted that the mobile terminal 101 may experience RLF in the target cell 132 during execution of the handover to the target cell 132 in some cases. In this case, the handover completion notification shown in FIG. 12 is transmitted to the source base station 111 after the connection re-establishment of the mobile terminal 101 to the neighboring cell 133 is completed.

The source base station 111 and the neighboring base station 113 of FIG. 12 cooperatively perform processing to detect Handover to Wrong Cell without receiving information (e.g., the HANDOVER REPORT message and the RLF INDICATION message) from the target base station 112. Specifically, in order to detect Handover to Wrong Cell, the HO failure detection unit 121 uses HO failure information received from the neighboring base station 113.

As a first example, the HO failure detection unit 121 may detect Handover to Wrong Cell when (a) a request for connection re-establishment from the mobile terminal 101 to the source cell 131 is not received within a predetermined period T4 dependent on the initiation of the outgoing handover of the mobile terminal 101, but (b) the HO failure information, which indicates that the mobile terminal 101 has requested connection re-establishment to the neighboring cell 133 within the predetermined period T4, is received. A predetermined period to determine a timing when the mobile terminal 101 requested the connection re-establishment to the neighboring cell 133 may be different from a predetermined period for reception determination of the re-establishment request to the source cell 131.

As a second example, the HO failure detection unit 121 may detect Handover to Wrong Cell when (a) a request for connection re-establishment from the mobile terminal 101 to the source cell 131 is not received after the initiation of the outgoing handover of the mobile terminal 101 and before completion of the handover (e.g., before reception of the handover completion notification), but (b) the HO failure information, which indicates that the mobile terminal 101 has requested connection re-establishment to the neighboring cell 133 before the completion of the handover, is received.

As a third example, the HO failure detection unit 121 may detect Handover to Wrong Cell when (a) a request for connection re-establishment from the mobile terminal 101 to the source cell 131 is not received within a predetermined period T5 dependent on the completion of the outgoing handover of the mobile terminal 101, but (b) the HO failure information, which indicates that the mobile terminal 101 has requested connection re-establishment to the neighboring cell 133 within the predetermined period T5, is received. A predetermined period to determine a timing when the mobile terminal 101 requested the connection re-establishment to the neighboring cell 133 may be different from a predetermined period for the reception determination of the re-establishment request to the source cell 131.

It is to be noted that for example, when transmission of the HO failure information by the neighboring base station 113 is sufficiently promptly performed, the HO failure detection unit 121 may detect Handover to Wrong Cell based on whether or not the HO failure information is received within the predetermined period. For example, in the above-mentioned first example, the HO failure detection unit 121 may detect Handover to Wrong Cell when the request for connection re-establishment from the mobile terminal 101 to the source cell 131 is not received within the predetermined period T4, but the HO failure information is received within the predetermined period T4. In the above-mentioned second example, the HO failure detection unit 121 may detect Handover to Wrong Cell when the HO failure information is received after the initiation of the outgoing handover of the mobile terminal 101 and before the completion of thereof, without the request for connection re-establishment from the mobile terminal 101 to the source cell 131 being received. In the above-mentioned third example, the HO failure detection unit 121 may detect Handover to Wrong Cell when the request for connection re-establishment from the mobile terminal 101 to the source cell 131 is not received within the predetermined period T5, but the HO failure information is received within the predetermined period T5. Also in these modified examples, a predetermined period for reception determination of the HO failure information may be different from the predetermined period for the reception determination of the re-establishment request to the source cell 131.

An HO failure information generation unit 123 arranged in the neighboring base station 113 generates the HO failure information without receiving information from the target base station 112, and sends the HO failure information to the source base station 111. The HO failure information may include: an identifier (e.g., a PCI) of the source cell (i.e., the cell 131) regarding the handover failure; an identifier (e.g., the PCI) of the target cell (i.e., the cell 132) regarding the handover failure; an identifier (e.g., the PCI) of the cell (i.e., the cell 133) to which the mobile terminal 101 has tried connection re-establishment after RLF in the target cell; and an identifier (e.g., the C-RNTI) of the mobile terminal 101 that has experienced the RLF in the target cell. Note that, when ECGIs of these cells can be obtained, the HO failure information generation unit 122 may notify the source base station 111 of the HO failure information including the ECGIs instead of the PCIs.

The HO failure information generation unit 122 may detect whether or not a source base station is present that has requested, within a predetermined period before the connection re-establishment of the mobile terminal 101 with the neighboring cell 133, the mobile terminal 101 to handover to the target cell 132. Subsequently, if the source base station is detected, the HO failure information generation unit 122 may transmit the HO failure information to the source base station. In other words, the HO failure information may be transmitted if the handover of the mobile terminal 101 has been initiated within the predetermined period before the connection re-establishment of the mobile terminal 101 with the neighboring cell 133. In order to detect whether or not the source base station is present, the HO failure information generation unit 122 may search for the source base station by asking one or more neighboring base stations (including the base station 111) that can communicate with the neighboring base station 113. For example, the HO failure information generation unit 122 may ask a base station that manages a cell (e.g. a cell registered in a neighboring cell list) to which a handover from the neighboring cell 133 can be performed. Alternatively, the HO failure information generation unit 122 may receive a movement history of the mobile terminal 101 therefrom. The movement history may indicate base stations to which the mobile terminal 101 was connected in the past, or a handover history. The movement history may be transmitted from the mobile terminal 101 to the base station 113 when the mobile terminal 101 requests connection re-establishment.

Figure 13:
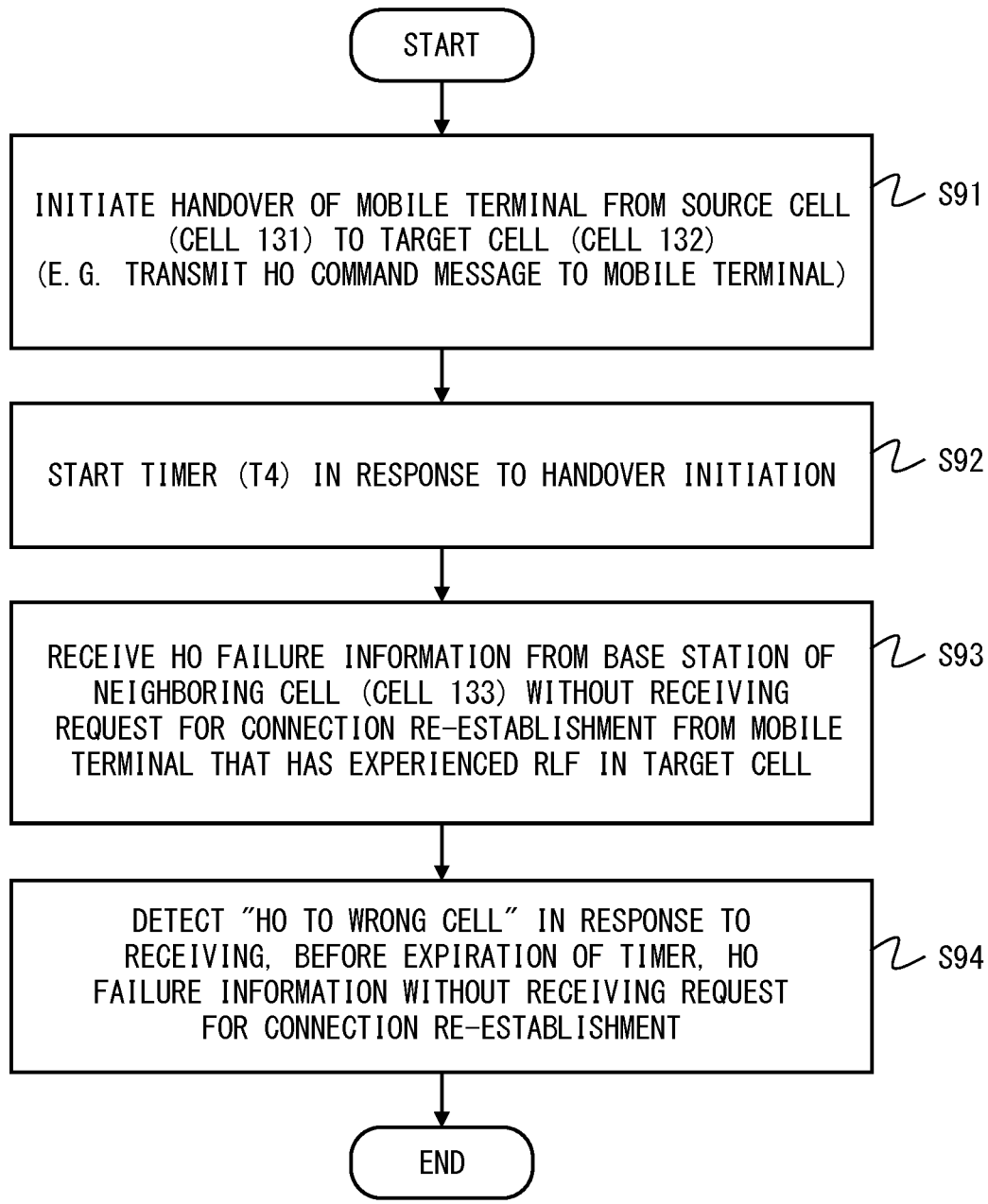
FIG. 13 is a flow chart showing a first example of a Handover to Wrong Cell detection procedure according to the fourth embodiment.

FIG. 13 is a flow chart showing a first example of a Handover to Wrong Cell detection procedure. In step S91, the source base station 111 initiates handover of the mobile terminal 101 from the source cell 131 to the target cell 132. Initiation of the handover may be transmission to the mobile terminal 101 of a handover command, may be transmission to the network node 141 of a handover request, or may be reception from the mobile terminal 101 of information to trigger the handover. In step S92, the source base station 111 starts a timer for measuring the predetermined period T4 in response to the handover initiation. In step S93, the source base station 111 receives HO failure information from the neighboring base station 113 without receiving a request for connection re-establishment from the mobile terminal 101 that has experienced RLF in the target cell 132. In step S94, the source base station 111 (i.e., the HO failure detection unit 121) detects that the handover having been attempted regarding the mobile terminal 101 is Handover to Wrong Cell, in response to receiving, before expiration of the timer, the HO failure information from the neighboring base station 113 without receiving the request for connection re-establishment to the source cell 131. That is, the HO failure detection unit 121 detects that an appropriate handover destination of the mobile terminal 101 would have been the neighboring cell 133.

Figure 14:
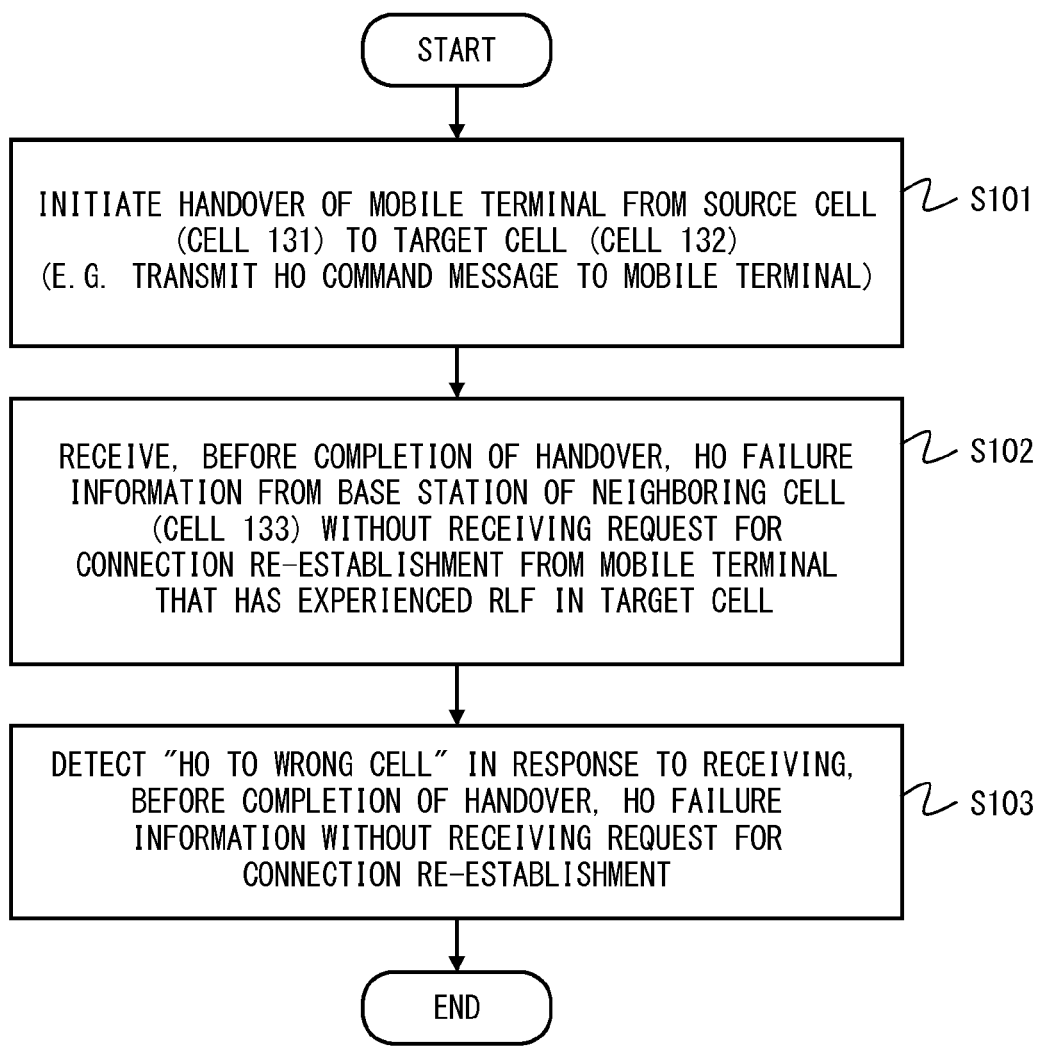
FIG. 14 is a flow chart showing a second example of a Handover to Wrong Cell detection procedure according to the fourth embodiment.

FIG. 14 is a flow chart showing a second example of a Handover to Wrong Cell detection procedure. Step S101 is similar to step S91 of FIG. 13. Namely, in step S101, the source base station 111 initiates handover of the mobile terminal 101 from the source cell 131 to the target cell 132. In step S102, the source base station 111 receives, after initiation of outgoing handover of the mobile terminal 101 and before completion thereof, HO failure information from the neighboring base station 113 without receiving a request for connection re-establishment from the mobile terminal 101 that has experienced RLF in the target cell 132. In step S103, the source base station 111 (i.e., the HO failure detection unit 121) detects that the outgoing handover of the mobile terminal 101 is Handover to Wrong Cell, in response to receiving, after the initiation of the outgoing handover of the mobile terminal 101 and before the completion thereof, the HO failure information from the neighboring base station 113 without receiving the request for connection re-establishment to the source cell 131.

Figure 15:
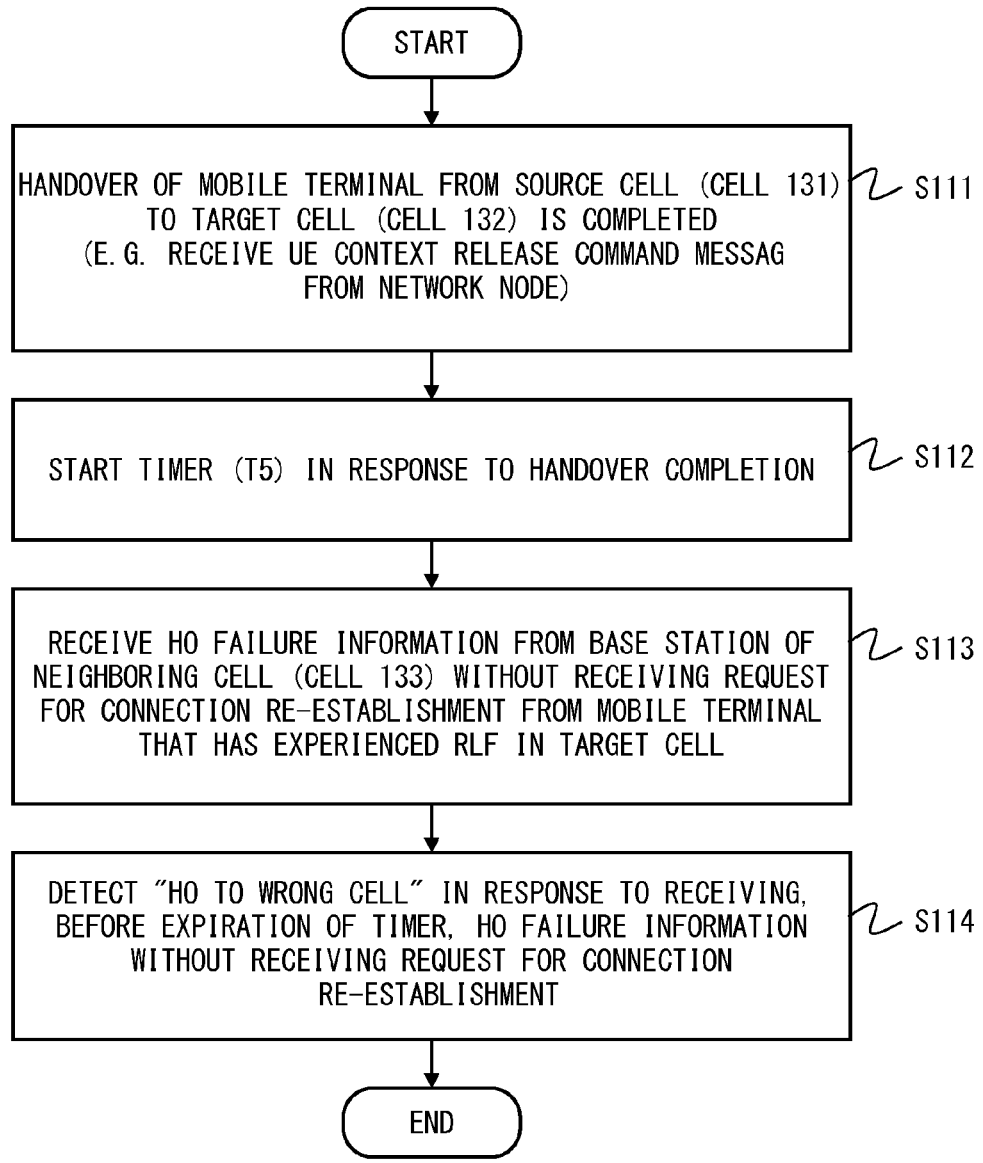
FIG. 15 is a flow chart showing a third example of a Handover to Wrong Cell detection procedure according to the fourth embodiment.

FIG. 15 is a flow chart showing a third example of a Handover to Wrong Cell detection procedure. In step S111, handover of the mobile terminal 101 from the source cell 131 to the target cell 132 is completed. For example, the source base station 111 receives a handover completion notification (e.g., the UE Context Release Command message) from the network node 141. In step S112, the source base station 111 starts a timer for measuring the predetermined period T5 in response to the handover completion. In step S113, the source base station 111 receives HO failure information from the neighboring base station 113 without receiving a request for connection re-establishment from the mobile terminal 101 that has experienced RLF in the target cell 132. In step S114, the source base station 111 (i.e., the HO failure detection unit 121) detects that the handover having been attempted regarding the mobile terminal 101 is Handover to Wrong Cell, in response to receiving, before expiration of the timer, the HO failure information from the neighboring base station 113 without receiving the request for connection re-establishment to the source cell 131.

Figure 16:
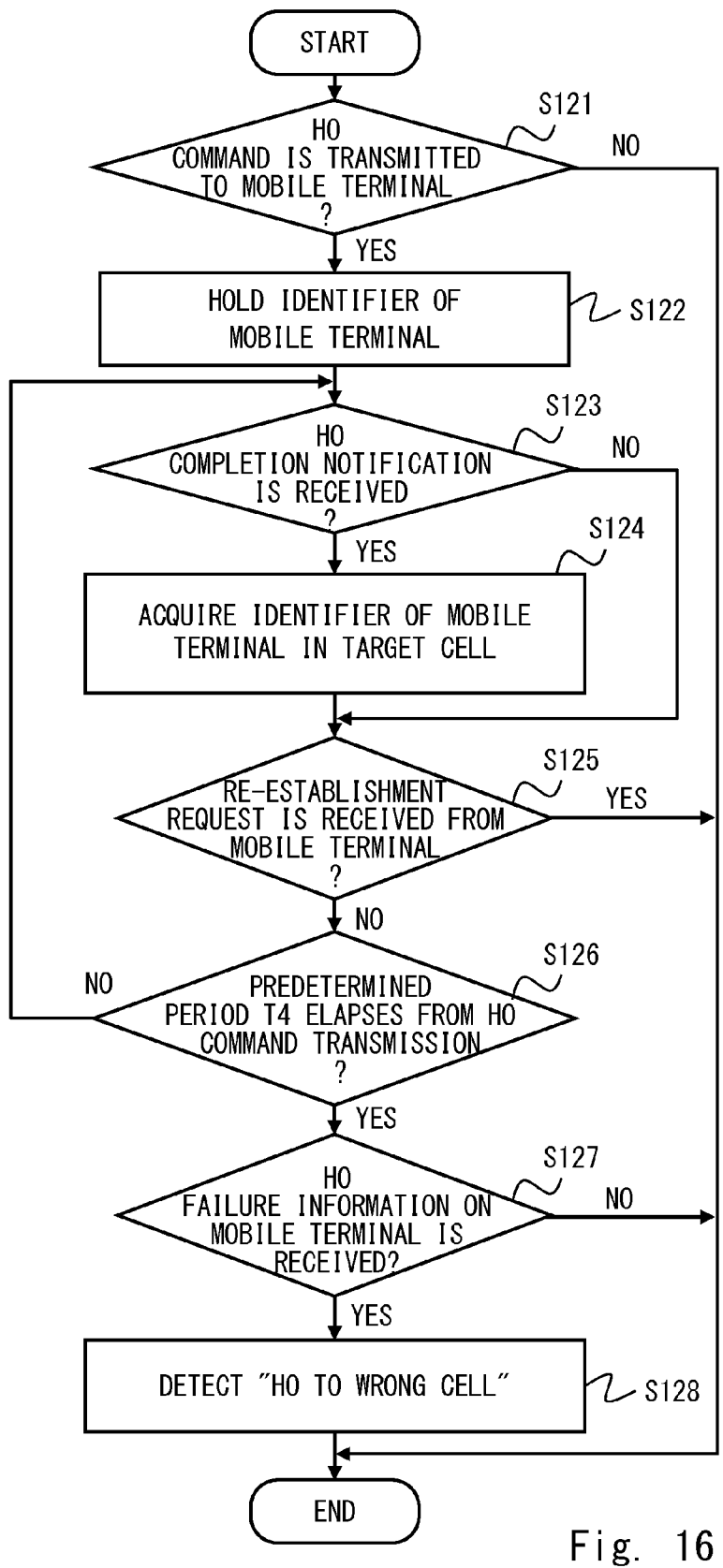
FIG. 16 is a flow chart showing a fourth example of a Handover to Wrong Cell detection procedure according to the fourth embodiment.

FIG. 16 is a flow chart showing a fourth example of a Handover to Wrong Cell detection procedure. Processing in steps S121 to S124 of FIG. 16 may be the same as processing in steps S71 to S74 shown in FIG. 10. In step S125, the HO failure detection unit 121 determines whether or not a request for connection re-establishment from the mobile terminal 101 to the source cell 131 has been received. If the request for connection re-establishment is not received (NO in step S125), the HO failure detection unit 121 repeats reception determination of the request for connection re-establishment until the predetermined period T4 elapses since the initiation of the handover (step S126). Subsequently, if the request for connection re-establishment from the mobile terminal 101 is not received within the predetermined period T4 (YES in step S126), the HO failure detection unit 121 determines whether or not HO failure information on the mobile terminal 101 has been received from the neighboring base station 113 (step S127). Specifically, in step S127, the HO failure detection unit 121 may determine whether or not the HO failure detection unit 121 has been received the HO failure information indicating that the mobile terminal 101 has requested the connection re-establishment to the neighboring cell 133 within the predetermined period T4. If the HO failure information on the mobile terminal 101 is received (YES in step S127), the HO failure detection unit 121 detects that the handover having been attempted regarding the mobile terminal 101 is Handover to Wrong Cell (step S128).

Figure 17:
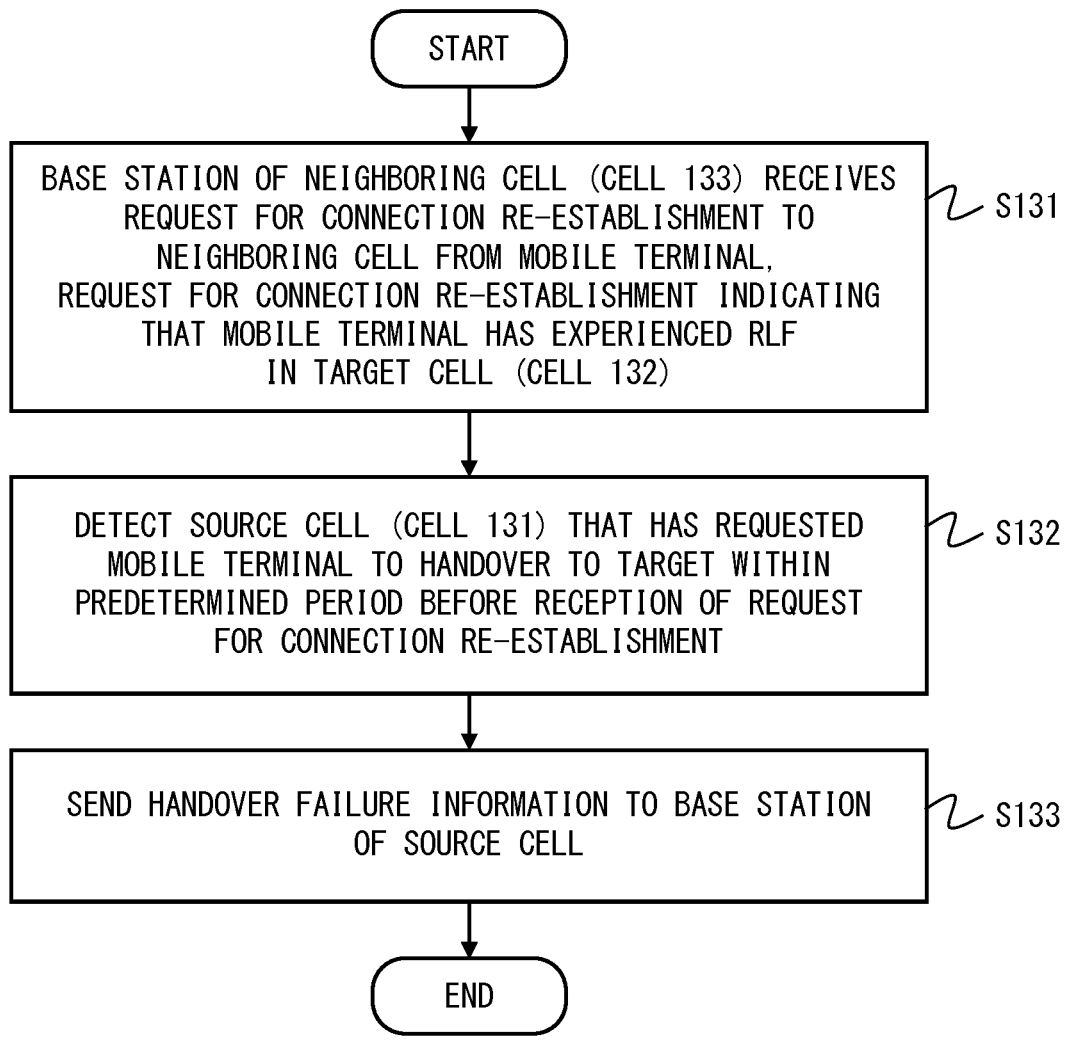
FIG. 17 is a flow chart showing a first example of a notification procedure of handover failure information according to the fourth embodiment.

FIG. 17 is a flow chart showing a first example of a notification procedure of handover failure information. In step S131, the neighboring base station 113 receives from the mobile terminal 101 a request for connection re-establishment to the neighboring cell 133. This request for connection re-establishment indicates that the mobile terminal 101 has experienced RLF in the target cell 132. In step S132, the HO failure information generation unit 122 detects a source cell (source base station) that has requested the mobile terminal 101 to handover to the target cell 132 within a predetermined period before reception of the connection re-establishment of the mobile terminal 101. In step S133, the HO failure information generation unit 122 sends the handover failure information to the detected source base station.

Figure 18:
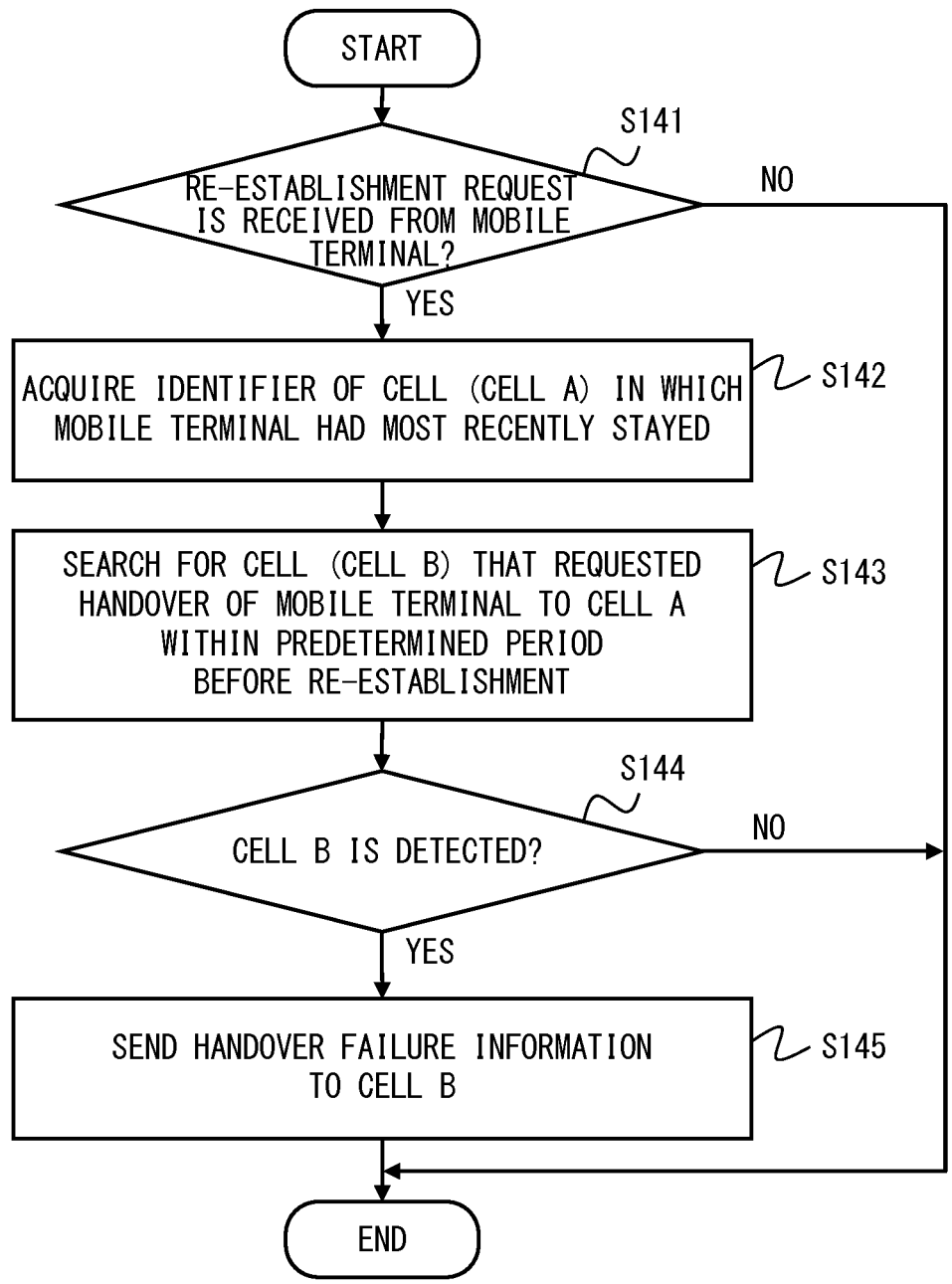
FIG. 18 is a flow chart showing a second example of a notification procedure of handover failure information according to the fourth embodiment.

FIG. 18 is a flow chart showing a second example of a notification procedure of the handover failure information. In step S141, the HO failure information generation unit 122 determines whether or not a request for connection re-establishment from the mobile terminal 101 to the neighboring cell 133 has been received. If the request for connection re-establishment is received (YES in step S141), the HO failure information generation unit 122 acquires and holds an identifier (e.g., the PCI) of a cell (cell A) in which the mobile terminal 101 had most recently stayed. The identifier of the cell A may be included in the request for connection re-establishment. In step S143, the HO failure information generation unit 122 searches for a source cell (cell B) that requested the handover of the mobile terminal 101 to the cell A within a predetermined period before the connection re-establishment of the mobile terminal (or before the reception of the re-establishment request). Subsequently, if the cell B is found (YES in step S144), the HO failure information generation unit 122 sends the HO failure information to the cell B. In the example of FIG. 12, the cell B corresponds to the source cell 131.

Figure 19:
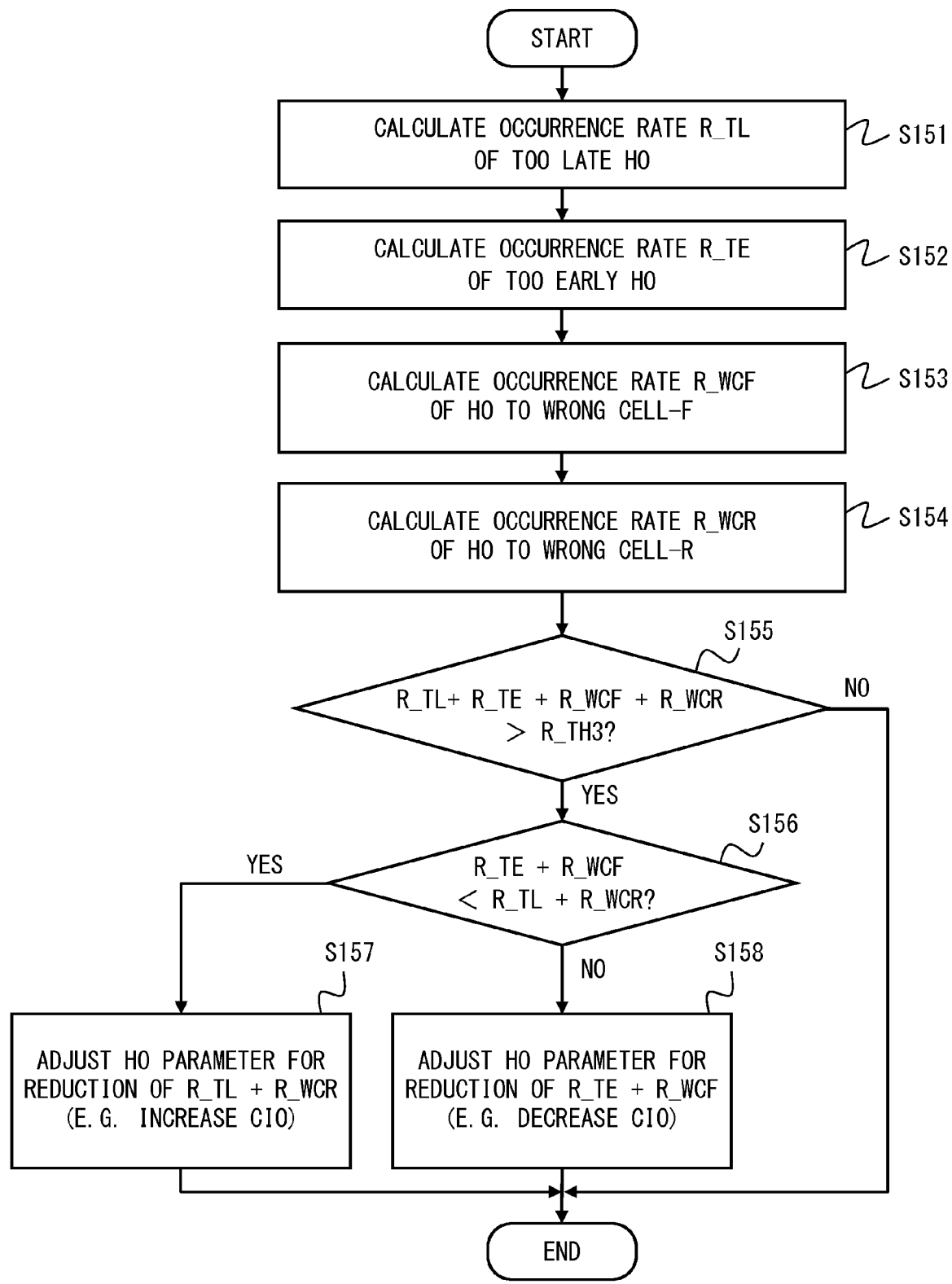
FIG. 19 is a flow chart showing one example of an HO parameter adjustment procedure according to the fourth embodiment.

FIG. 19 is a flow chart showing an example of an HO parameter adjustment procedure performed by the HO parameter adjustment unit 151. In the example of FIG. 11, the HO parameter adjustment unit 151 adjusts an HO parameter in response to detection of Too Late Handover, Too Early Handover, and Handover to Wrong Cell. Too Late Handover and Too Early Handover may be detected in accordance with the above-mentioned second and third embodiments. In steps S151 and 152, the HO parameter adjustment unit 151 calculates the occurrence rate R_TL of Too Late Handover and the occurrence rate R_TE of Too Early Handover regarding handover from the source cell 131 to the target cell 132 similarly to steps S81 and S82 of FIG. 11.

In step S153, the HO parameter adjustment unit 151 calculates an occurrence rate R_WCF of Handover to Wrong Cell-F in which the cell 132 is an inappropriate target cell, based on feedback information received from the HO failure detection unit 121. In addition, in step S154, the HO parameter adjustment unit 151 calculates an occurrence rate R_WCR of Handover to Wrong Cell-R in which the cell 132 is a re-connection cell (i.e., a true target cell).

The HO parameter adjustment unit 151 adjusts an HO parameter when a total sum of the R_TL, R_TE, R_WCF, and R_WCR is larger than a predetermined threshold value R_TH3 (step S155). Specifically, if (R_TL+R_WCR) is larger than (R_TE+R_WCF) (YES in step S156), HO parameter adjustment for reducing Too Late Handover to the cell 132 and Handover to Wrong Cell-R to the cell 132 (step S157) is performed. In contrast with this, if the (R_TE+R_WCF) is not less than the (R_TL+R_WCR) (NO in step S156), HO parameter adjustment for reducing Too Early Handover to the cell 132 and Handover to Wrong Cell-F to the cell 132 is performed (step S158). In the adjustment of the HO parameter in step S158, the CIO that acts on radio quality of the target cell 132 may be decreased by a predetermined step size. In addition or alternatively, the TTT applied to the source cell 131 may be increased by a predetermined step size. In addition or alternatively, the A3-offset that acts on radio quality of the source cell 131 may be increased by a predetermined step size. It is to be noted that in step S157, adjustment may be performed so as to increase or decrease the HO parameter in an opposite direction of step S158.

As is understood from the above explanation, the HO failure detection unit 121 and the HO failure information generation unit 122 according to the present embodiment can detect Handover to Wrong Cell in a situation where neither the source base station 111 nor the neighboring base station 113 can receive information (e.g., the HANDOVER REPORT message and the RLF INDICATION message) from the target base station 112. This Handover to Wrong Cell means that the target cell 132 is an inappropriate target cell, and that the cell 133 managed by the neighboring base station 113 is a re-connection cell (i.e., a true target cell). In addition, the HO parameter adjustment unit 151 can perform the adjustment of the HO parameter for reducing Handover to Wrong Cell in that situation.

Fifth Embodiment

In the present embodiment, detection of Handover to Wrong Cell regarding the handover from the source cell 131 to the target cell 132 will be explained. Note that, the above-mentioned fourth embodiment has explained the example where the target base station 112 cannot transmit or receive information to or from the other two base stations (the source base station 111 and the neighboring base station 113). In contrast, the present embodiment will explain an example where the neighboring base station 113 cannot transmit or receive information to or from the other two base stations (the source base station 111 and the target base station 112). A configuration example of the radio communication system 100 according to the present embodiment is the same as FIG. 1.

Figure 20:
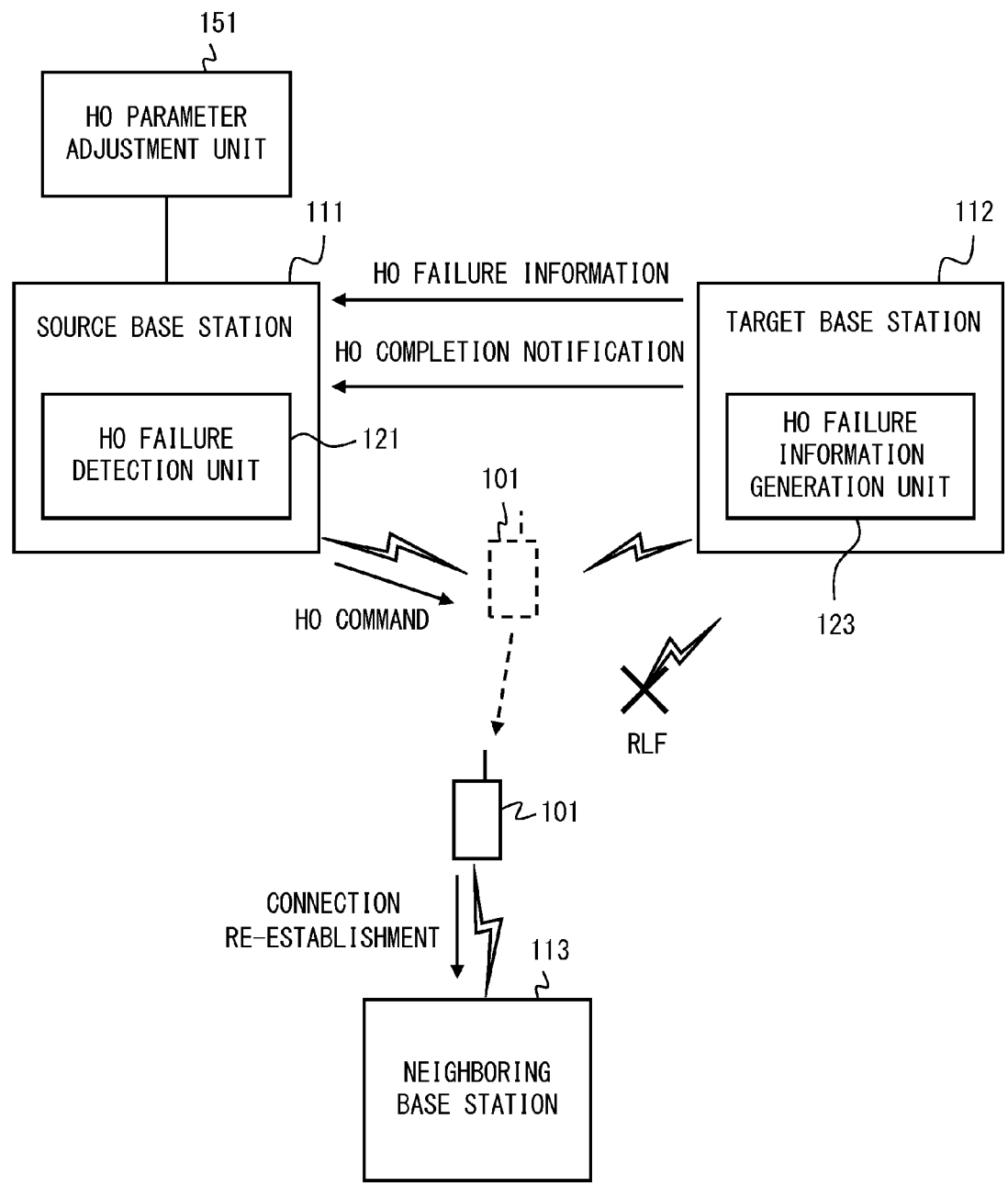
FIG. 20 is a block diagram showing a configuration example of a radio communication system according to the fifth embodiment.

FIG. 20 shows a situation where Handover to Wrong Cell occurs. In FIG. 20, the neighboring base station 113 cannot transmit or receive information (e.g., the HANDOVER REPORT message and the RLF INDICATION message) to or from the other two base stations (the source base station 111 and the target base station 112). Meanwhile, the source base stations 111 can communicate with the target base station 112, and receives handover (HO) failure information from the target base station 112. The HO failure information may be transmitted via an inter-base-station interface (e.g., the X2 interface) between the source base station 111 and the target base station 112, or may be transmitted via the network 140.

In FIG. 20, at the beginning, the mobile terminal 101 is connected to the source base station 111 (source cell 131), and performs communication through the source base station 111. Simultaneously, the mobile terminal 101 is located near the target base station 112 and the neighboring base station 113. After that, the source base station 111 decides and initiates outgoing handover of the mobile terminal 101 to the target cell 132 (target base station 112). In the example of FIG. 20, the source base station 111 transmits a handover command (e.g., the HO Command message) to the mobile terminal 101 in order to initiate handover. As already mentioned, the initiation of the handover may correspond to transmission of a handover request (e.g., the Handover Request message) from the source base station 111 to the target base station 112. Alternatively, the initiation of the handover may correspond to reception by the source base station 111 of information (e.g., the Measurement Report) to trigger the handover.

Subsequently, the source base station 111 receives a handover completion notification (e.g., the "UE Context Release Command" message) transmitted in response to completion of the handover of the mobile terminal 101 to the target cell 132. However, the mobile terminal 101 experiences RLF in the target cell 132 immediately after completion of the handover. After that, the mobile terminal 101 detects that radio quality of the neighboring cell 133 is good, and transmits a request for connection re-establishment to the neighboring cell 133 (neighboring base station 113). It is to be noted that the mobile terminal 101 may experience RLF in the target cell 132 during execution of the handover to the target cell 132 in some cases. In this case, the handover completion notification shown in FIG. 20 is transmitted to the source base station 111 after the connection re-establishment of the mobile terminal 101 to the neighboring cell 133 is completed.

The source base station 111 and the target base station 112 of FIG. 20 cooperatively perform processing to detect Handover to Wrong Cell without receiving information (e.g., the HANDOVER REPORT message and the RLF INDICATION message) from the neighboring base station 113 that manages the neighboring cell 133 (i.e., the true target cell) to which the mobile terminal 101 has been re-connected. Specifically, in order to detect Handover to Wrong Cell, the HO failure detection unit 121 arranged in the source base station 111 uses HO failure information received from the target base station 112. A specific example of a detection technique by the HO failure detection unit 121 is similar to the first to third examples described in the fourth embodiment except that a transmission source of the HO failure information is different from them.

Namely, as a first example, the HO failure detection unit 121 may detect Handover to Wrong Cell when (a) a request for connection re-establishment from the mobile terminal 101 to the source cell 131 is not received within the predetermined period T4 dependent on the initiation of the outgoing handover of the mobile terminal 101, but (b) the HO failure information, which indicates that the mobile terminal 101 has experienced RLF in the target cell 132 within the predetermined period T4, is received. A predetermined period to determine a timing when the mobile terminal 101 experienced RLF in the target cell 132 may be different from a predetermined period for reception determination of the re-establishment request to the source cell 131.

As a second example, the HO failure detection unit 121 may detect Handover to Wrong Cell when (a) a request for connection re-establishment from the mobile terminal 101 to the source cell 131 is not received after the initiation of the outgoing handover of the mobile terminal 101 and before the completion of the handover (e.g., before reception of the handover completion notification), but (b) the HO failure information, which indicates that the mobile terminal 101 has experienced RLF in the target cell 132 before the completion of the handover, is received.

As a third example, the HO failure detection unit 121 may detect Handover to Wrong Cell when (a) the request for connection re-establishment from the mobile terminal 101 to the source cell 131 is not received within the predetermined period T5 dependent on the completion of the outgoing handover of the mobile terminal 101, but (b) the HO failure information, which indicates that the mobile terminal 101 has experienced RLF in the target cell 132 within the predetermined period T5, is received. A predetermined period to determine a timing when the mobile terminal 101 experienced RLF in the target cell 132 may be different from a predetermined period for reception determination of the re-establishment request to the source cell 131.

It is to be noted that for example, when transmission of the HO failure information by the neighboring base station 113 is sufficiently promptly performed, the HO failure detection unit 121 may detect Handover to Wrong Cell based on whether or not the HO failure information is received within a predetermined period. For example, in the above-mentioned first example, the HO failure detection unit 121 may detect Handover to Wrong Cell when the request for connection re-establishment from the mobile terminal 101 to the source cell 131 is not received within the predetermined period T4, but the HO failure information is received within the predetermined period T4. In the above-mentioned second example, the HO failure detection unit 121 may detect Handover to Wrong Cell when the HO failure information is received after the initiation of the outgoing handover of the mobile terminal 101 and before the completion of thereof, without the request for connection re-establishment from the mobile terminal 101 to the source cell 131 being received. In the above-mentioned third example, the HO failure detection unit 121 may detect Handover to Wrong Cell when the request for connection re-establishment from the mobile terminal 101 to the source cell 131 is not received within the predetermined period T5, but the HO failure information is received within the predetermined period T5. Also in these modified examples, a predetermined period for reception determination of the HO failure information may be different from a predetermined period for the reception determination of the re-establishment request to the source cell 131.

The HO failure information generation unit 123 arranged in the target base station 112 generates the HO failure information without receiving information from the neighboring base station 113, and sends the HO failure information to the source base station 111. The HO failure information may include: an identifier (e.g., a PCI) of the source cell (i.e., the cell 131) regarding the handover failure; an identifier (e.g., the PCI) of the target cell (i.e., the cell 132) regarding the handover failure; an identifier (e.g., the PCI) of the cell (i.e., the cell 133) to which the mobile terminal 101 has tried connection re-establishment after RLF in the target cell; and an identifier (e.g., the C-RNTI) of the mobile terminal 101 that has experienced the RLF in the target cell. Note that, when ECGIs of these cells can be obtained, the HO failure information generation unit 123 may notify the source base station 111 of the HO failure information including the ECGIs instead of the PCIs.

The HO failure information generation unit 123 may transmit HO failure information when a loss of synchronization of the mobile terminal 101 is detected within a predetermined period after the mobile terminal 101 is connected to the target cell 132. The connection of the mobile terminal 101 with the target cell 132 may be detected, for example, by receiving at the target base station 112 a message (e.g., a "Handover Confirm" message) transmitted from the mobile terminal 101 to the target cell 132 during the handover procedure. It is to be noted that a starting point of a predetermined period for detecting the loss of synchronization can be appropriately set. For example, the starting point of the predetermined period may be a time when a handover of the mobile terminal 101 is completed. In addition, the loss of synchronization of the mobile terminal 101 can also be represented as abnormal disconnection (including RLF) of the mobile terminal 101. The loss of synchronization between the target cell 132 and the mobile terminal 101 may be detected, for example, when a response message (ACK) from the mobile terminal 101 does not received within a predetermined period after the target base station 112 transmits a packet to the mobile terminal 101.

When the loss of synchronization of the mobile terminal 101 occurs, the HO failure information generation unit 123 carries out processing to estimate a cell to which the mobile terminal 101 tries connection re-establishment. Subsequently, the HO failure information generation unit 123 includes an identifier of the estimated cell in the HO failure information. The HO failure information generation unit 123 may use the measurement report that has been received from the mobile terminal 101 by the target base station 112 in order to estimate the cell to which the mobile terminal 101 tries the connection re-establishment. The measurement report includes measurement results of radio quality of the target cell 132 to which the mobile terminal 101 had been connected, and radio quality of neighboring cells (the cell 131, the cell 133, etc.). The mobile terminal 101 generally selects a cell having the best radio quality, and tries the connection re-establishment to the selected cell. Accordingly, a neighboring cell indicated to have the best radio quality except for the target cell 132 in the measurement report may be estimated as the cell to which the connection re-establishment is tried. The HO failure information generation unit 123 may include, in the HO failure information, identifiers of a plurality of cells having relatively good radio quality among the cells included in the measurement report.

It is to be noted that a trigger condition of the measurement report may be set so that the measurement report from the mobile terminal 101 to the target cell 132 is performed immediately before the abnormal disconnection (or the loss of synchronization). For example, it may be set as the trigger condition of the measurement report that radio quality (Qs) of the target cell 132 to which the mobile terminal 101 is connected and radio quality (Qn) of a neighboring cell satisfy the following Expression (2).

$$Qs<Q\_th1 \text{ and } Qn>Q\_th2 \qquad (2)$$

Here, $Q\_th1$ is a threshold value to Qs, and $Q\_th2$ is a threshold value to Qn. The trigger condition like Expression (2) is, for example, defined by 3GPP TS 36.331. The measurement report is sent immediately before the abnormal disconnection by using a stricter value compared with a required value of the radio quality, i.e., by adding margin values to the threshold values $Q\_th1$ and $Q\_TH2$. As the radio quality, for example, RSRP (Reference Signal Received Power) or RSRQ (Reference Signal Received Quality) defined by 3GPP TS 36.214 can be used.

Figure 21:
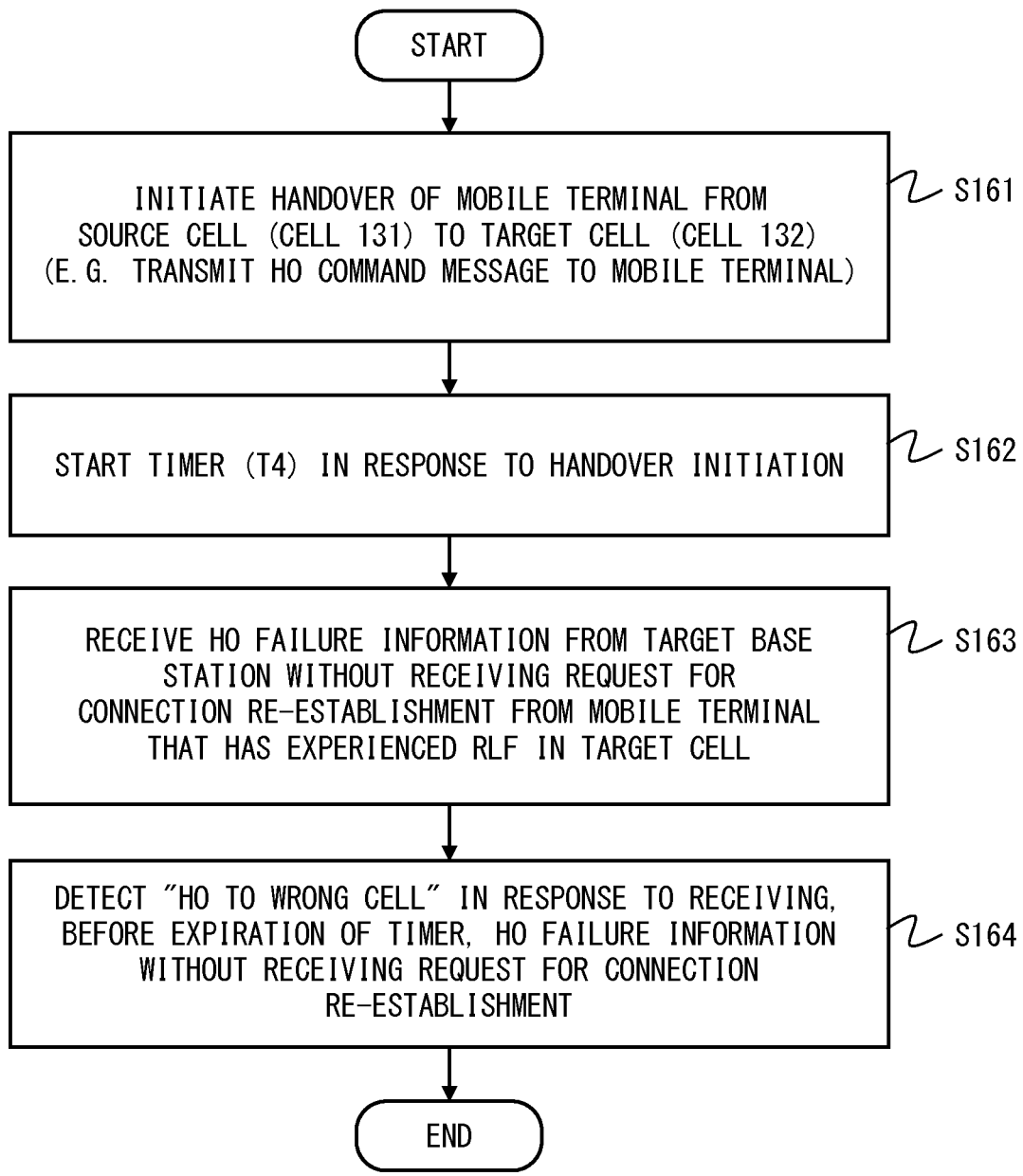
FIG. 21 is a flow chart showing a first example of a Handover to Wrong Cell detection procedure according to the fifth embodiment.
Figure 22:
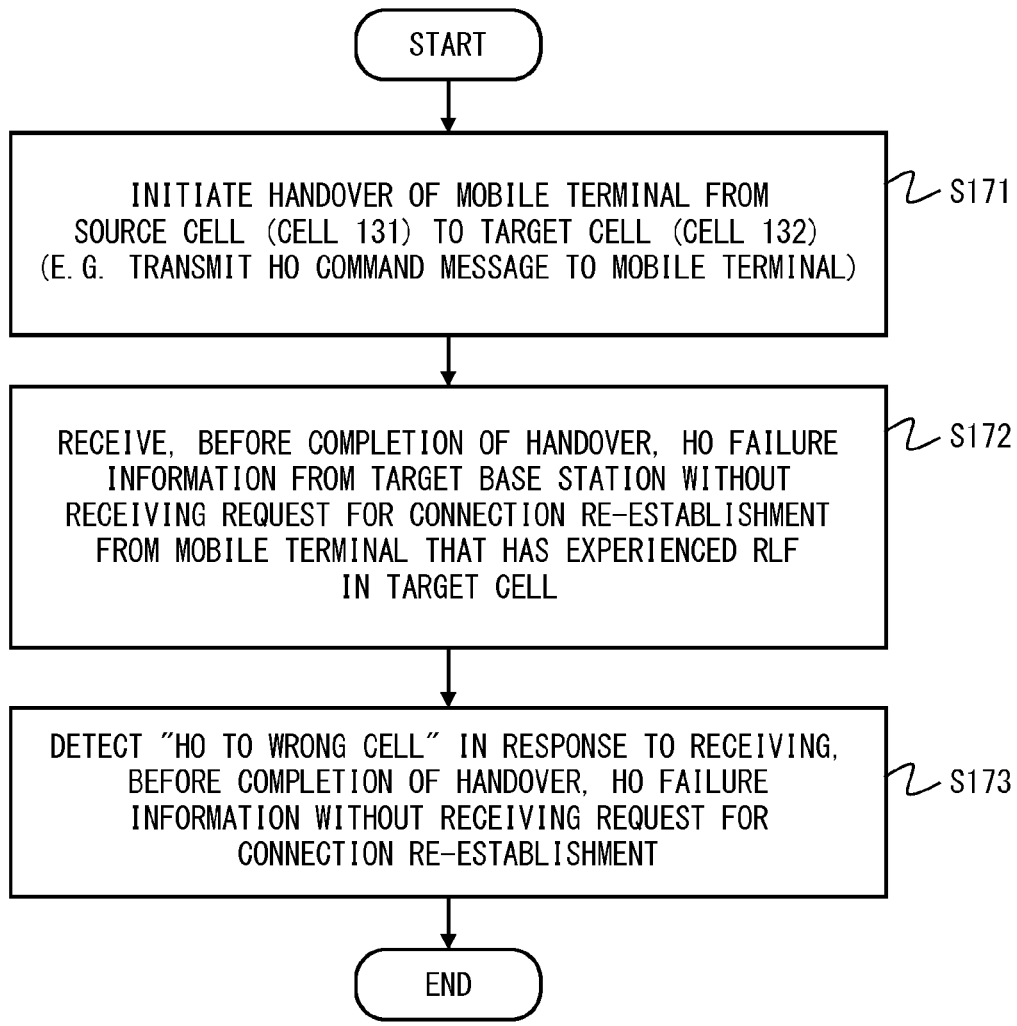
FIG. 22 is a flow chart showing a second example of a Handover to Wrong Cell detection procedure according to the fifth embodiment.
Figure 23:
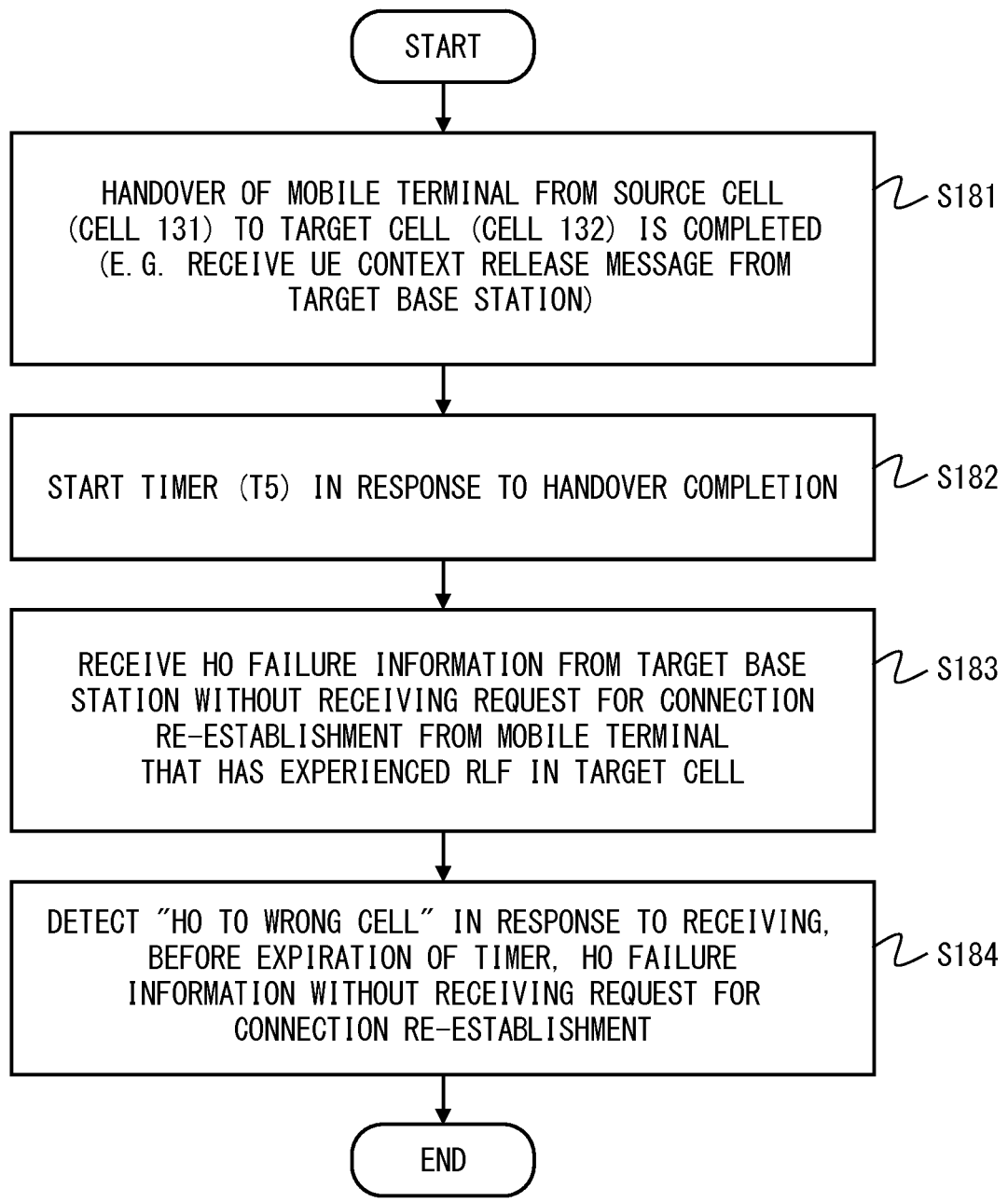
FIG. 23 is a flow chart showing a third example of a Handover to Wrong Cell detection procedure according to the fifth embodiment.

FIGS. 21 to 23 are flow charts showing the first to third examples of a Handover to Wrong Cell detection procedure in the present embodiment. It is to be noted that the flow charts of FIGS. 21 and 23 are similar to the flow charts of FIGS. 13 to 15 explained in the fourth embodiment except that a transmission source of the HO failure information is the target base station 112. Accordingly, detailed explanation regarding these flow charts is omitted here. Namely, steps S161 to S164 of FIG. 21 correspond to steps S91 to S94 of FIG. 13, respectively. Steps S171 to S173 of FIG. 22 correspond to steps S101 to S103 of FIG. 14, respectively. In addition, steps S181 to S184 of FIG. 23 correspond to steps S111 to S114 of FIG. 15, respectively. Note that, as is apparent from comparison of step S163 of FIG. 21 and step S93 of FIG. 13, a transmission source of the HO failure information is the target base station 112 in step S163. This is similarly applied to step S172 of FIG. 22 and step S183 of FIG. 23.

Figure 24:
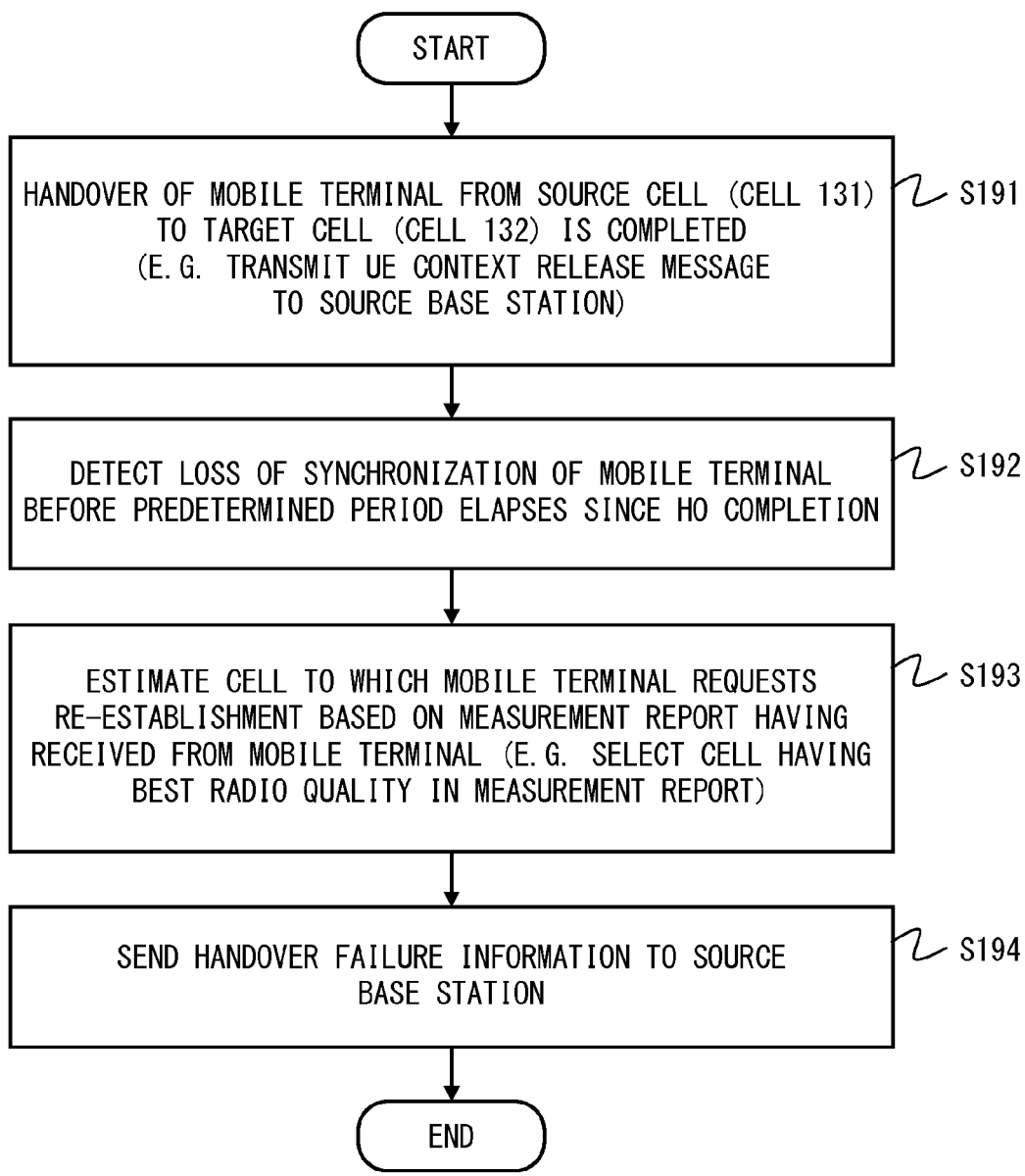
FIG. 24 is a flow chart showing a first example of a notification procedure of handover failure information according to the fifth embodiment.

FIG. 24 is a flow chart showing a first example of a notification procedure of the handover failure information in the present embodiment. In step S191, handover of the mobile terminal 101 from the source cell 131 to the target cell 132 is completed. For example, the target base station 112 transmits a handover completion notification (e.g. the UE Context Release message) to the source base station 111. In step S192, the HO failure information generation unit 123 detects a loss of synchronization of the mobile terminal 101 within a predetermined period after the handover of the mobile terminal 101 to the target cell 132 is completed. In step S193, the HO failure information generation unit 123 estimates a cell to which the mobile terminal 101 requests re-establishment based on a measurement report that has been received from the mobile terminal 101. For example, the HO failure information generation unit 123 may select a cell having the best radio quality in the measurement report. In step S194, the HO failure information generation unit 123 sends the HO failure information to the source base station 111 (i.e., the HO failure detection unit 121).

Figure 25:
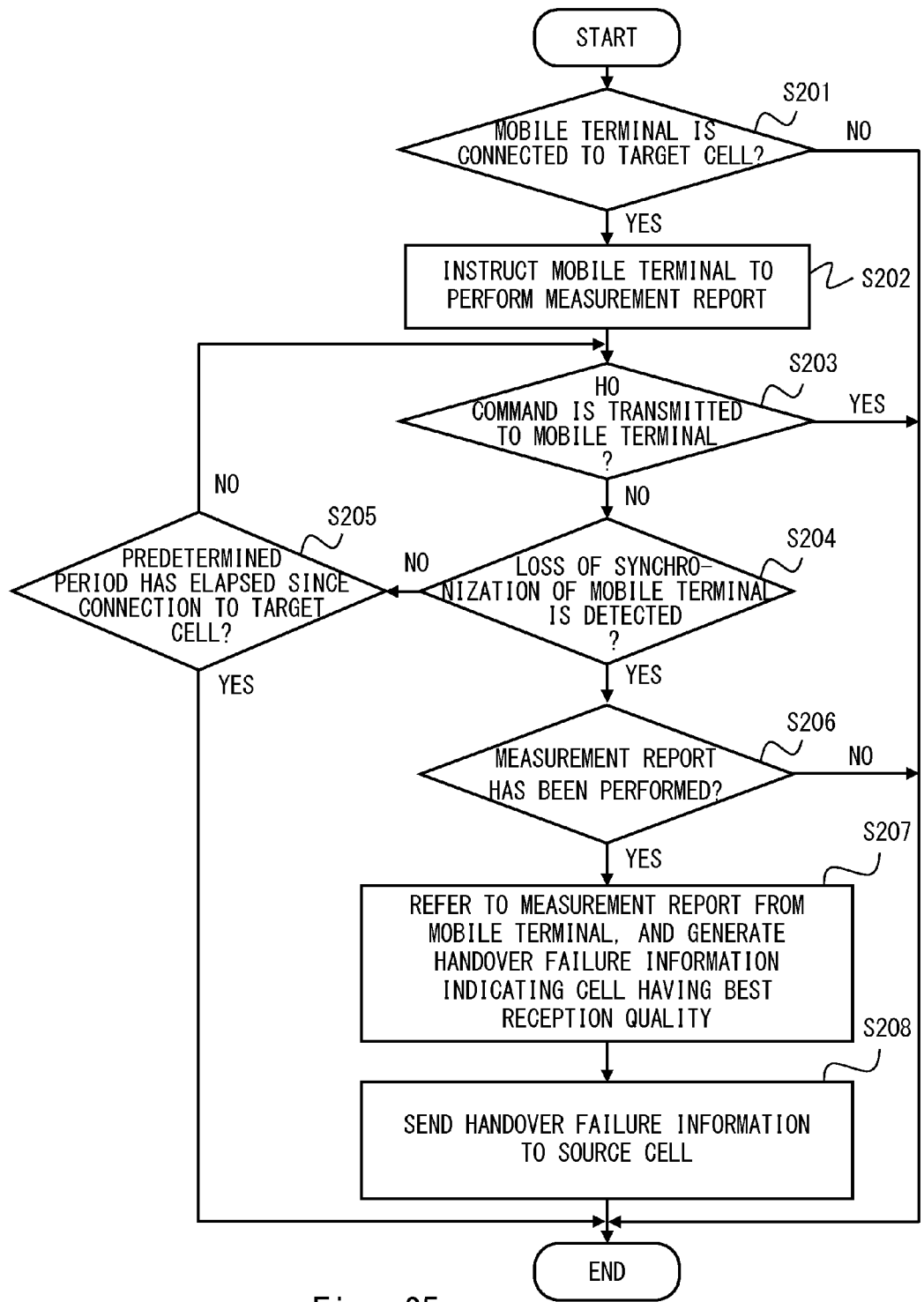
FIG. 25 is a flow chart showing a second example of a notification procedure of handover failure information according to the fifth embodiment.

FIG. 25 is a flow chart showing a second example of a notification procedure of the handover failure information in the present embodiment. In step S201, the target base station 112 determines whether or not the mobile terminal 101 is connected to the target cell 132. Connection of the mobile terminal 101 to the target cell 132 may be detected by a message (e.g., the "Handover Confirm" message) transmitted from the mobile terminal 101 during the handover procedure having been received by the target base station 112. In step S202, the target base station 112 instructs the mobile terminal 101 to transmit a measurement report. In step S203, the HO failure information generation unit 123 determines whether or not handover of the mobile terminal 101 has been initiated. For example, the target base station 112 may confirm whether or not a handover command (e.g., the Handover Command message) has been transmitted to the mobile terminal 101. In step S204, the HO failure information generation unit 123 detects whether or not a loss of synchronization of the mobile terminal 101 has occurred in a situation where the handover is not initiated. If the loss of synchronization of the mobile terminal 101 does not occur (NO in step S204), the HO failure information generation unit 123 continuously monitors the loss of synchronization of the mobile terminal 101 in a situation where the handover is not initiated, until a predetermined time elapses since connection of the mobile terminal 101 to the target cell 132 (i.e., step S201) (step S205).

Meanwhile, if the loss of synchronization of the mobile terminal 101 occurs (YES in step S204), the HO failure information generation unit 123 confirms whether or not the measurement report from the mobile terminal 101 has been received (step S206). If the measurement report has been received from the mobile terminal 101 (YES in step S206), the HO failure information generation unit 123 refers to the received measurement report, and generates handover failure information indicating a cell having the best radio quality. In step S208, the HO failure information generation unit 123 sends the handover failure information to the source cell 131.

As is understood from the above explanation, the HO failure detection unit 121 and the HO failure information generation unit 123 according to the present embodiment can detect Handover to Wrong Cell in a situation where neither the source base station 111 nor the target base station 112 can receive information (e.g., the HANDOVER REPORT message and the RLF INDICATION message) from the neighboring base station 113. This Handover to Wrong Cell means that the target cell 132 is an inappropriate target cell, and that the cell 133 managed by the neighboring base station 113 is a re-connection cell (i.e., a true target cell). In addition, the HO parameter adjustment unit 151 can perform the adjustment of the HO parameter for reducing Handover to Wrong Cell in that situation.

Other Embodiments

The above-mentioned first to fifth embodiments can be combined as appropriate.

The processes performed by the HO failure detection unit 121, the HO failure information generation units 122 and 123, and the HO parameter adjustment unit 151 that have been explained in the first to fifth embodiments may be implemented by using a semiconductor processing device including an ASIC (Application Specific Integrated Circuit). In addition, these processes may be implemented by causing a computer system including at least one processor (e.g. a microprocessor, an MPU, a DSP (Digital Signal Processor)) to execute a program. Specifically, one or more programs including instructions to cause a computer system to execute the algorithm regarding the HO failure detection unit 121 (or the HO failure information generation unit 122 or 123, or the HO parameter adjustment unit 151) explained with reference to the flow charts etc. may be created and supplied the program(s) to the computer.

The program(s) can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (Read Only Memory), CD-R, CD-R/W, and semiconductor memories (such as mask ROM, PROM (Programmable ROM), EPROM (Erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line, such as electric wires and optical fibers, or a radio communication line.

Furthermore, the invention is not limited to the embodiments described above, and it will be obvious that various modifications may be made therein without departing from the spirit and scope of the present invention described above.

This application is based upon and claims the benefit of priority from Japanese patent application No. 2013-022846, filed on Feb. 8, 2013, the disclosure of which is incorporated herein in its entirety by reference.

REFERENCE SIGNS LIST

100 RADIO COMMUNICATION SYSTEM
101 MOBILE TERMINAL
111-113 BASE STATIONS
121 HANDOVER (HO) FAILURE DETECTION UNIT
122, 123 HANDOVER (HO) FAILURE INFORMATION GENERATION UNITS
131-133 CELLS
140 NETWORK
141 NETWORK NODE
150 NETWORK MANAGEMENT SYSTEM
151 HANDOVER (HO) PARAMETER ADJUSTMENT UNIT

What is claimed is:

1. A handover failure detection device comprising:
at least one memory that stores instructions; and
at least one processor configured to execute the instructions to detect at least one of handover failure types regarding outgoing handover from a first cell managed by a first base station by observing (a) presence/absence of reception by the first base station of an acknowledgment response to a handover command regarding first handover of a mobile terminal from the first cell to a second cell managed by a second base station, and (b) presence/absence of a request for connection re-establishment from the mobile terminal to the first cell, the request occurring after initiation of the first handover,
wherein the acknowledgment response to the handover command is transmitted to the first base station from the mobile terminal, and
the instructions causes the at least one processor to detect a first handover failure type when the acknowledgment response to the handover command is not received within a first predetermined period dependent on initiation of the first handover and the request for connection re-establishment is also not received within a second predetermined period dependent on initiation of the first handover.

2. The handover failure detection device according to claim 1, wherein the instructions cause the at least one processor to detect a second handover failure type when the request for connection re-establishment is received within a third predetermined period dependent on initiation of the first handover.

3. The handover failure detection device according to claim 1, wherein the instructions cause the at least one processor to detect a second handover failure type when the request for connection re-establishment is received before reception of a handover completion notification regarding the first handover.

4. The handover failure detection device according to claim 3, wherein the handover completion notification is transmitted to the first base station from the second base station or from a network node belonging to a higher network to which the first base station is connected.

5. The handover failure detection device according to claim 3, wherein the handover completion notification is a message received by the first base station during a handover procedure.

6. The handover failure detection device according to claim 1, wherein the instructions cause the at least one processor to detect a second handover failure type when the request for connection re-establishment is received within a fourth predetermined period dependent on reception of a handover completion notification regarding the first handover.

7. The handover failure detection device according to claim 1, wherein
the instructions cause the at least one processor to detect a third handover failure type when the request for connection re-establishment is not received within a fifth predetermined period dependent on initiation of the first handover, but handover failure information is received from the second base station within a sixth predetermined period dependent on initiation of the first handover, and
the third handover failure type corresponds to a situation where the mobile terminal that has experienced abnormal disconnection in the second cell during execution of the first handover or after completion of the first handover tries connection re-establishment to a third cell different from both the first and second cells.

8. The handover failure detection device according to claim 7, wherein the handover failure information includes an identifier of the third cell that is estimated by the second base station based on measurement information of radio quality by the mobile terminal when the mobile terminal is connected to the second cell without receiving information at the second base station from a third base station that manages the third cell.

9. The handover failure detection device according to claim 7, wherein the handover failure information is transmitted when the mobile terminal experiences the abnormal disconnection in the second cell within a seventh predetermined period dependent on connection of the mobile terminal to the second cell by the first handover.

10. The handover failure detection device according to claim 1, wherein
the instructions cause the at least one processor to detect a third handover failure type when the request for connection re-establishment is not received within an eighth predetermined period dependent on initiation of the first handover, but handover failure information is received from a third base station that manages a third cell different from both the first and second cells within a ninth predetermined period dependent on initiation of the first handover, and
the third handover failure type corresponds to the situation where the mobile terminal that has experienced the abnormal disconnection in the second cell during the execution of the first handover or after the completion of the first handover tries the connection re-establishment to the third cell different from both the first and second cells.

11. The handover failure detection device according to claim 10, wherein the handover failure information is transmitted when the third base station detects presence of a base station that has requested handover of the mobile terminal to the second cell within a tenth predetermined period before the connection re-establishment of the mobile terminal in the third cell.

12. The handover failure detection device according to claim 1, wherein the instructions cause the at least one processor to generate feedback information on handover from the first cell based on a detection result of the at least one of the handover failure types.

13. The handover failure detection device according to claim 12, wherein the feedback information indicates the number of occurrences or an occurrence rate of the at least one of the handover failure types.

14. The handover failure detection device according to claim 1, wherein the acknowledgment response to the handover command is an acknowledgment response to be transmitted to the first base station by the mobile terminal in order to control a re-transmission of a message transmitted to the mobile terminal from the first base station during a handover procedure.

15. A handover parameter adjustment device comprising:
at least one memory that stores instructions; and
at least one processor configured to execute the instructions to adjust a handover parameter for controlling outgoing handover from a first cell managed by a first base station based on (a) presence/absence of reception by the first base station of an acknowledgment response to a handover command regarding first handover of a mobile terminal from the first cell to a second cell managed by a second base station, and (b) presence/absence of a request for connection re-establishment from the mobile terminal to the first cell, the request occurring after initiation of the first handover,
wherein the acknowledgment response to the handover command is transmitted to the first base station from the mobile terminal, and
the instructions causes the at least one processor to:
make each of the at least one of the handover failure types correspond to any of a plurality of adjustment directions of the handover parameter;
calculate a total sum of the number of occurrences or an occurrence rate of the handover failure type made to correspond to the each adjustment direction, as for each of the plurality of adjustment directions; and
adjust the handover parameter to the adjustment direction where the total sum of the number of occurrences or the occurrence rate is the largest.

16. The handover parameter adjustment device according to claim 15, wherein
the instructions cause the at least one processor to receive feedback information based on a detection result of at least one of handover failure types regarding the outgoing handover from the first cell, and
the detection result of the at least one of the handover failure types is obtained by observation of the presence/absence of the reception of the acknowledgment response to the handover command, and the presence/absence of the request for connection re-establishment.

17. The handover parameter adjustment device according to claim 16, wherein the instructions cause the at least one processor to adjust the handover parameter by analyzing the feedback information.

18. The handover parameter adjustment device according to claim 15, wherein the handover parameter includes at least one of a first offset that acts on radio quality of the first cell, a second offset that acts on radio quality of the second cell, and a guard time for triggering transmission of a measurement report by the mobile terminal connected to the first cell.

19. A system for handover optimization comprising:
a detection device comprising at least one hardware processor configured to detect at least one of handover failure types regarding outgoing handover from a first cell managed by a first base station by observing (a) presence/absence of reception by the first base station of an acknowledgment response to a handover command regarding first handover of a mobile terminal from the first cell to a second cell managed by a second base station, and (b) presence/absence of a request for connection re-establishment from the mobile terminal to the first cell, the request occurring after initiation of the first handover; and
an adjustment device comprising at least one hardware processor configured to adjust a handover parameter for controlling the outgoing handover from the first cell based on a detection result of the at least one of the handover failure types,
wherein the acknowledgment response to the handover command is transmitted to the first base station from the mobile terminal, and
the at least one hardware processor in the detection device is configured to detect a first handover failure type when the acknowledgment response to the handover command is not received within a first predetermined period dependent on initiation of the first handover and the request for connection re-establishment is also not received within a second predetermined period dependent on initiation of the first handover.

20. The system according to claim 19, wherein the at least one hardware processor in the detection device is configured to detect a second handover failure type when the request for connection re-establishment is received within a third predetermined period dependent on initiation of the first handover.

21. The system according to claim 19, wherein the at least one hardware processor in the detection device is configured to detect a second handover failure type when the request for connection re-establishment is received before reception of a handover completion notification regarding the first handover.

22. The system according to claim 19, wherein the at least one hardware processor in the detection device is configured to detect a second handover failure type when the request for connection re-establishment is received within a fourth predetermined period dependent on reception of a handover completion notification regarding the first handover.

23. The system according to claim 19, further comprising a generation device comprising at least one hardware processor configured to generate handover failure information and notifying the detection device of the handover failure information, wherein
the at least one hardware processor in the detection device is configured to detect a third handover failure type when the request for connection re-establishment is not received within a fifth predetermined period dependent on initiation of the first handover, but the handover failure information is received within a sixth predetermined period dependent on initiation of the first handover, and
the third handover failure type corresponds to a situation where the mobile terminal that has experienced abnormal disconnection in the second cell during execution of the first handover or after completion of the first handover tries connection re-establishment to a third cell different from both the first and second cells.

24. The system according to claim 23, wherein
the generation device is coupled to the second base station, and
the handover failure information includes an identifier of the third cell that is estimated by the generation device based on measurement information of radio quality by the mobile terminal when the mobile terminal is connected to the second cell without receiving information at the generation device from a third base station that manages the third cell.

25. The system according to claim 23, wherein
the generation device is coupled to the second base station, and
the at least one hardware processor in the generation device is configured to transmit the handover failure information when the mobile terminal experiences the abnormal disconnection in the second cell within a seventh predetermined period dependent on connection of the mobile terminal to the second cell by the first handover.

26. The system according to claim 23, wherein
the generation device is coupled to a third base station that manages the third cell, and
the at least one hardware processor in the generation device is configured to transmit the handover failure information in response to detecting presence of a base station that has requested handover of the mobile terminal to the second cell within an eighth predetermined period before connection re-establishment of the mobile terminal in the third cell.

27. The system according to claim 26, wherein the at least one hardware processor in the generation device is configured to detect, from base stations that manage cells to which handover can be performed from the third cell, the base station that has requested of the mobile terminal the handover to the second cell.

28. The system according to claim 23, wherein
the handover parameter includes a second offset that acts on radio quality of the second cell and a third offset that acts on radio quality of the third cell, and
the at least one hardware processor in the adjustment device is configured to, when an occurrence rate of the third handover failure type exceeds a predetermined value, decrease the second offset and increases the third offset.

29. The system according to claim 19, wherein the handover parameter includes at least one of a first offset that acts on radio quality of the first cell, a second offset that acts on radio quality of the second cell, and a guard time for triggering transmission of a measurement report by the mobile terminal connected to the first cell.

30. The system according to claim 29, wherein
the at least one hardware processor in the adjustment device is configured to execute, when an occurrence rate of the first handover failure type exceeds a predetermined value, at least one of decrease in the first offset, increase in the second offset, and decrease in the guard time.

31. The system according to claim 29, wherein
the at least one hardware processor in the detection device is configured to detect a second handover failure type when the request for connection re-establishment is received: within a third predetermined period dependent on initiation of the first handover; before reception of a handover completion notification regarding the first handover; or within a fourth predetermined period dependent on reception of the handover completion notification regarding the first handover, and the at least one hardware processor in the adjustment device is configured to execute, when an occurrence rate of the second handover failure type exceeds a predetermined value, at least one of the increase in the first offset, the decrease in the second offset, and the increase in the guard time.

32. A base station comprising the handover failure detection device according to claim 1.

33. A handover failure detection method comprising:

detecting at least one of handover failure types regarding outgoing handover from a first cell managed by a first base station by observing (a) presence/absence of reception by the first base station of an acknowledgment response to a handover command regarding first handover of a mobile terminal from the first cell to a second cell managed by a second base station, and (b) presence/absence of a request for connection re-establishment from the mobile terminal to the first cell, the request occurring after initiation of the first handover, wherein the acknowledgment response to the handover command is transmitted to the first base station from the mobile terminal, and the detecting includes detecting a first handover failure type when the acknowledgment response to the handover command is not received within a first predetermined period dependent on initiation of the first handover and the request for connection re-establishment is also not received within a second predetermined period dependent on initiation of the first handover.

34. A handover parameter adjustment method comprising:

adjusting a handover parameter for controlling outgoing handover from a first cell managed by a first base station based on (a) presence/absence of reception by the first base station of an acknowledgment response to a handover command regarding first handover of a mobile terminal from the first cell to a second cell managed by a second base station, and (b) presence/absence of a request for connection re-establishment from the mobile terminal to the first cell, the request occurring after initiation of the first handover, wherein the acknowledgment response to the handover command is transmitted to the first base station from the mobile terminal, and the adjusting includes:
  making each of the at least one of the handover failure types correspond to any of a plurality of adjustment directions of the handover parameter;
  calculating a total sum of the number of occurrences or an occurrence rate of the handover failure type made to correspond to the each adjustment direction, as for each of the plurality of adjustment directions; and
  adjusting the handover parameter to the adjustment direction where the total sum of the number of occurrences or the occurrence rate is the largest.

35. A non-transitory computer readable medium storing a program for causing a computer to perform a method for handover failure detection, wherein the method includes detecting at least one of handover failure types regarding outgoing handover from a first cell managed by a first base station by observing (a) presence/absence of reception by the first base station of an acknowledgment response to a handover command regarding first handover of a mobile terminal from the first cell to a second cell managed by a second base station, and (b) presence/absence of a request for connection re-establishment from the mobile terminal to the first cell, the request occurring after initiation of the first handover, wherein the acknowledgment response to the handover command is transmitted to the first base station from the mobile terminal, and the detecting includes detecting a first handover failure type when the acknowledgment response to the handover command is not received within a first predetermined period dependent on initiation of the first handover and the request for connection re-establishment is also not received within a second predetermined lined period dependent on initiation of the first handover.

36. A non-transitory computer readable medium storing a program for causing a computer to perform a method for handover parameter adjustment, wherein the method includes adjusting a handover parameter for controlling outgoing handover from a first cell managed by a first base station based on (a) presence/absence of reception by the first base station of an acknowledgment response to a handover command regarding first handover of a mobile terminal from the first cell to a second cell managed by a second base station, and (b) presence/absence of a request for connection re-establishment from the mobile terminal to the first cell, the request occurring after initiation of the first handover, wherein the acknowledgment response to the handover command is transmitted to the first base station from the mobile terminal, and the adjusting includes:
  making each of the at least one of the handover failure types correspond to any of a plurality of adjustment directions of the handover parameter;
  calculating a total sum of the number of occurrences or an occurrence rate of the handover failure type made to correspond to the each adjustment direction, as for each of the plurality of adjustment directions; and
  adjusting the handover parameter to the adjustment direction where the total sum of the number of occurrences or the occurrence rate is the largest.

* * * * *